(12) United States Patent
Li et al.

(10) Patent No.: US 12,033,070 B2
(45) Date of Patent: Jul. 9, 2024

(54) LOW RESOURCE COMPUTATIONAL BLOCK FOR A TRAINED NEURAL NETWORK

(71) Applicants: Xinlin Li, Montreal (CA); Vahid Partovi Nia, Montreal (CA)

(72) Inventors: Xinlin Li, Montreal (CA); Vahid Partovi Nia, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1040 days.

(21) Appl. No.: 16/900,658

(22) Filed: Jun. 12, 2020

(65) Prior Publication Data

US 2021/0390386 A1   Dec. 16, 2021

(51) Int. Cl.
| | | |
|---|---|---|
| *G06N 3/08* | (2023.01) | |
| *G06N 3/04* | (2023.01) | |
| *G06N 3/045* | (2023.01) | |
| *G06N 3/063* | (2023.01) | |
| *G06N 3/084* | (2023.01) | |
| *G06N 20/00* | (2019.01) | |
| *G06V 10/44* | (2022.01) | |
| *G06V 10/82* | (2022.01) | |
| *G06V 30/18* | (2022.01) | |

(52) U.S. Cl.
CPC .............. *G06N 3/08* (2013.01); *G06N 3/04* (2013.01); *G06N 3/045* (2023.01); *G06N 3/063* (2013.01); *G06N 3/084* (2013.01); *G06N 20/00* (2019.01); *G06V 10/454* (2022.01); *G06V 10/82* (2022.01); *G06V 30/18057* (2022.01)

(58) Field of Classification Search
None
See application file for complete search history.

(56) References Cited

U.S. PATENT DOCUMENTS

| | | |
|---|---|---|
| 2020/0065661 A1 | 2/2020 | Tong et al. |
| 2020/0097818 A1 | 3/2020 | Li et al. |

(Continued)

FOREIGN PATENT DOCUMENTS

| | | |
|---|---|---|
| CN | 108171323 A | 6/2018 |
| CN | 108304786 A | 7/2018 |

OTHER PUBLICATIONS

Holesovsky, Ondrej. "Compact ConvNets with ternary weights and binary activations." (2017). (Year: 2017).*

(Continued)

*Primary Examiner* — Eric Nilsson

(57) ABSTRACT

A computational block configured to perform an inference task by applying a plurality of low resource computing operations to a binary input feature tensor to generate an integer feature tensor that is equivalent to an output of multiplication and accumulation operations performed in respect of a ternary weight tensor and the binary input feature tensor; and performing a comparison operation between the generated integer feature tensor and a comparison threshold to generate a binary output feature tensor. The plurality of low resource computing operations are applied to the binary input feature tensor using first and second weight tensors that each include n binary elements and that collectively represent a respective n elements of the ternary weight tensor

20 Claims, 8 Drawing Sheets

(56) References Cited

U.S. PATENT DOCUMENTS

2020/0167654 A1  5/2020  Guo et al.
2020/0301668 A1* 9/2020  Li .......................... G11C 11/54

OTHER PUBLICATIONS

Hande Alemdar, Vincent Leroy, Adrien Prost-Boucle, and Frederic Petrot. Ternary neural networks for resource-efficient ai applications. 2017 International Joint Conference on Neural Networks (IJCNN), May 2017. May 2017.

Matthieu Courbariaux, Yoshua Bengio, and Jean-Pierre David. Binaryconnect: Training deep neural networks with binary weights during propagations. CoRR, abs/1511.00363, 2015. 2015.

Matthieu Courbariaux, Itay Hubara, Daniel Soudry, Ran El-Yaniv, and Yoshua Bengio. Binarized neural networks: Training deep neural networks with weights and activations constrained to +1 or −1. 2016. 2016.

Josh Fromm, Shwetak Patel, and Matthai Philipose. Heterogeneous bitwidth binarization in convolutional neural networks. CoRR, abs/1805.10368, 2018. 2018.

Ross Girshick. Fast r-cnn. 2015 IEEE International Conference on Computer Vision (ICCV), Dec. 2015. Dec. 2015.

Ross Girshick, Jeff Donahue, Trevor Darrell, and Jitendra Malik. Rich feature hierarchies for accurate object detection and semantic segmentation. 2014 IEEE Conference on Computer Vision and Pattern Recognition, Jun. 2014. Jun. 2014.

Xavier Glorot and Yoshua Bengio. Understanding the difficulty of training deep feedforward neural networks. In Yee Whye Teh and Mike Titterington, editors, Proceedings of the Thirteenth International Conference on Artificial Intelligence and Statistics, vol. 9 of Proceedings of Machine Learning Research, pp. 249-256, Chia Laguna Resort, Sardinia, Italy, May 13-15, 2010. PMLR. May 2010.

Kaiming He, Xiangyu Zhang, Shaoqing Ren, and Jian Sun. Delving deep into rectifiers: Surpassing human-level performance on imagenet classification. CoRR, abs/1502.01852, 2015. 2015.

Ondrej Holesovsky. Compact convnets with ternary weights and binary activations, 2017. 2017.

Sergey Ioffe and Christian Szegedy. Batch normalization: Accelerating deep network training by reducing internal covariate shift. CoRR, abs/1502.03167, 2015. 2015.

Fengfu Li and Bin Liu. Ternary weight networks. CoRR, abs/1605.04711, 2016. 2016.

Xiaofan Lin, Cong Zhao, and Wei Pan. Towards accurate binary convolutional neural network. CoRR, abs/1711.11294, 2017. 2017.

Zhouhan Lin, Matthieu Courbariaux, Roland Memisevic, and Yoshua Bengio. Neural networks with few multiplications. CoRR, abs/1510.03009, 2015. 2015.

Wei Liu, Dragomir Anguelov, Dumitru Erhan, Christian Szegedy, Scott E. Reed, Cheng-Yang Fu, and Alexander C. Berg. SSD: single shot multibox detector. CoRR, abs/1512.02325, 2015. 2015.

Zechun Liu, Baoyuan Wu, Wenhan Luo, Xin Yang, Wei Liu, and Kwang-Ting Cheng. Bi-real net: Enhancing the performance of 1-bit cnns with improved representational capability and advanced training algorithm. Lecture Notes in Computer Science, p. 747â€"763, 2018. 2018.

Andrew L. Maas, Awni Y. Hannun, and Andrew Y. Ng. Rectifier nonlinearities improve neural network acoustic models. In in ICML Workshop on Deep Learning for Audio, Speech and Language Processing, 2013. 2013.

Asit K. Mishra, Eriko Nurvitadhi, Jeffrey J. Cook, and Debbie Marr. WRPN: wide reduced-precision networks. CoRR, abs/1709.01134, 2017. 2017.

Mohammad Rastegari, Vicente Ordonez, Joseph Redmon, and Ali Farhadi. Xnor-net: Imagenet classification using binary convolutional neural networks. CoRR, abs/1603.05279, 2016. 2016.

Joseph Redmon, Santosh Divvala, Ross Girshick, and Ali Farhadi. You only look once: Unified, real-time object detection. 2016 IEEE Conference on Computer Vision and Pattern Recognition (CVPR), Jun. 2016. Jun. 2016.

Shaoqing Ren, Kaiming He, Ross Girshick, and Jian Sun. Faster r-cnn, towards real-time object detection with region proposal networks. IEEE Transactions on Pattern Analysis and Machine Intelligence, 39(6):1137â€"1149, Jun. 2017. Jun. 2017.

Yi Sun, Ding Liang, Xiaogang Wang, and Xiaoou Tang. Deepid3: Face recognition with very deep neural networks. CoRR, abs/1502.00873, 2015. 2015.

Yi Sun, Xiaogang Wang, and Xiaoou Tang. Deep learning face representation by joint identification-verification, 2014. 2014.

Yi Sun, Xiaogang Wang, and Xiaoou Tang. Deep learning face representation from predicting 10,000 classes. In Proceedings of the IEEE conference on computer vision and pattern recognition, pp. 1891-1898, 2014. 2014.

Wei Tang, Gang Hua, and Liang Wang. How to train a compact binary neural network with high accuracy?, 2017. 2017.

Diwen Wan, Fumin Shen, Li Liu, Fan Zhu, Jie Qin, Ling Shao, and Heng Tao Shen. Tbn: Convolutional neural network with ternary inputs and binary weights. In The European Conference on Computer Vision (ECCV), Sep. 2018. Sep. 2018.

Shuchang Zhou, Zekun Ni, Xinyu Zhou, He Wen, Yuxin Wu, and Yuheng Zou. Dorefa-net: Training low bitwidth convolutional neural networks with low bitwidth gradients. CoRR, abs/1606.06160, 2016. 2016.

Chenzhuo Zhu, Song Han, Huizi Mao, and William J. Dally. Trained ternary quantization. CoRR, abs/1612.01064, 2016. 2016.

* cited by examiner

LOW RESOURCE COMPUTATIONAL BLOCK FOR A TRAINED NEURAL NETWORK

FIELD

This disclosure relates generally to artificial neural networks. More particularly, the present application relates to a computational block having quantized inputs and parameters for a layer of a trained neural network.

BACKGROUND

Artificial neural networks (NNs) are computing systems that are modeled on how biological brains operate. NNs are made up of a number of layers (e.g., computational blocks) that each include a plurality of computational units (called neurons), with connections among computational units of different layers. Each computational unit (e.g., each neuron) in a NN transforms data using a series of computations that include each respective computational unit multiplying an initial value by some weight, summing the results with other values coming into the same respective computational unit, adjusting the resulting number by the respective bias of the computational unit, and then normalizing the output with an activation function. The bias is a number which adjusts the value of a respective computational unit once all the connections are processed, and the activation function ensures values that are passed on to a subsequent computational unit within a tunable, expected range. The series of computations is repeated until a final output layer of the NN generates scores or predictions related to a particular inference task. NNs can learn to perform inference tasks, such as object detection, image classification, clustering, voice recognition, or pattern recognition. NNs typically do not need to be programmed with any task-specific rules. Instead, NNs generally perform supervised learning tasks, building knowledge from data sets where the right answer is provided in advance. NNs then learn by tuning themselves to find the right answer on their own, increasing the accuracy of their predictions.

NNs have become larger (i.e., deeper) and more complicated. This has inevitably increased the number and size of layers in the NN to the point where it can be costly to implement the NN in software or hardware. NNs increasingly rely on usage of specially designed, computationally powerful hardware devices that include one or more processing units, accelerators (e.g., accelerators designed to perform certain operations of the NN) and supporting memory to perform the operations of each of the layers of the NN (hereinafter referred to generally as NN operations and individually as NN operation). In some examples, a dedicated processing unit, accelerator and supporting memory are packaged in a single integrated circuit. The computationally powerful hardware devices required for executing NN operations of deep NNs come with increased financial cost, as well as ancillary costs in terms of physical space and thermal cooling requirements.

Deep NNs are commonly full precision NN's constructed using full-precision layers that are made up of full-precision computational units. Full-precision layers perform NN operations, such as a matrix multiplication, addition, batch normalization, and multiply-accumulate (MAC) in respect of values that each have more than 8 bits (e.g., the individual elements in a feature tensor such as a input feature vector or feature map are each real values represented using 8 or more bits, and the network layer parameters such as weights included in a weight tensor are also real values represented using 8 or more bits). NN operations performed in the context of a full precision layer are referred to as high-bit NN operations. In particular, each element output of a computational unit in a layer of NN (e.g., $i^{th}$ layer of NN) is a weighted sum of all the feature elements input to the computational unit, which requires a large number of multiply-accumulate (MAC) operations per full-precision layer. Accordingly, the high-bit NN operations performed by a full-precision NN layer are computationally intensive. This places constraints on the use of full-precision NN's in computationally constrained hardware devices.

Accordingly, there is a growing interest in NN compression techniques that may reduce the number of NN operations required performed by a NN configured for a particular inference task and thereby enable NNs to be deployed in computationally constrained hardware devices that may for example employ less powerful processing units, less powerful (or no) accelerators, less memory and/or less power than required for deployment of a non-compressed NN. NN compression techniques may for example be applied in cost-effective computationally constrained hardware devices that can be implemented to solve real-world problems in applications such as robotics, autonomous driving, drones, and the internet of things (IOT). Neural network quantization is one NN compression technique being adopted to address the challenge of compressing a trained NN to enable NN operations to be performed on resource-constrained hardware device. Among other things, NN quantization may be used to replace high-bit MAC operations performed at an NN layer with bitwise operations. Because the smallest bit width MAC operator supported by a general-purpose processing unit is an 8-bit MAC operator, conventional quantization techniques reduce full precision matrix multiplication operations to 8-bit matrix multiplication operations for execution by an 8-bit MAC operator. Any NN quantization technique that reduces full precision matrix multiplication operations to matrix multiplication operations having a bit width smaller than 8 bits (i.e., a number of bits less 8 bits) must be performed either by a computational unit using bitwise operators or using a specific hardware device. NN layers that use bitwise operations can be configured as low-bit layers in which operations are performed using elements that are represented as 1 or 2 bit values.

Low-bit neural network quantization techniques can generally be classified into two different categories: (i) weight quantization techniques that quantize the real-valued weight tensor received by a NN layer but use real-valued input feature map tensors in the NN operations of the NN layer; and (ii) weight and feature map quantization techniques that quantize both real-valued weight tensor and input feature map tensor.

A limitation of low-bit quantization techniques is that when a trained NN that has been compressed is deployed for inference (i.e., to make predictions on new data) the compressed trained NN suffers from deficiencies either in respect of one or more of computational costs and memory requirements. For example, the compressed trained NN still requires a large number of multiply-accumulate (MAC) operations that can be computationally and memory intensive.

Accordingly, there is a need for a low-bit computational block that can be used to implement of a layer of a NN that, once trained, can accurately generate a binary feature map tensor for a subsequent computational block of a NN (e.g., a subsequent layer of a NN) with less computational costs and memory requirements than existing low-bit NN solutions.

SUMMARY

The present disclosure provides methods and systems for performing an inference task efficiently on a resource constrained hardware device. In a trained NN, an inference stage computational block uses low resource computing operations to replace a large number of resource intensive multiply-accumulate (MAC) operations. These low resource computing operations may include basic logic and mathematical operations such as AND, POPCOUNT, SUBTRACTION, and comparison operations. Methods and systems disclosed herein may in some applications use less computational resources, for example processing power and memory, to perform an inference task and generate a feature vector. In example embodiment the inference stage computational block enables a trained NN that includes one or more inference stage computational blocks to be deployed on a resource constrained hardware device so that it uses fewer processor computations, less memory, and/or less power than prior solutions.

According to a first example aspect is a computer implemented method that includes applying a plurality of low resource computing operations to generate an integer feature tensor that is equivalent to an output of multiplication and accumulation operations performed in respect of a ternary weight tensor and a binary input feature tensor; and performing a comparison operation between the generated integer feature tensor and a comparison threshold to generate a binary output feature tensor.

In at least some applications, the use of low resource computing operations to provide an output that is the equivalent of a set of multiplication and accumulation operations enables the method to be performed without the use of computationally and memory intensive multiply-accumulate (MAC) operations. This may enable the method to be performed using computationally constrained hardware devices that have one or more of limited processing power, limited memory, or limited power supply, including for example edge devices. The method may for example enable a neural network (NN) to be deployed in computationally constrained hardware devices that may for example employ less powerful processing units, less powerful (or no) accelerators, less memory and/or less power that required by prior solutions.

According to some examples of the preceding aspect, the generated integer feature tensor comprises a set of m integer elements, each integer element having a value that is the equivalent of a dot product of a set of n ternary elements of the ternary weight tensor and a set of n binary elements of the binary input feature tensor.

According to examples of one or more of the preceding aspects, for each integer element of the integer feature tensor: the plurality of low resource computing operations are applied using first and second weight tensors that each include n binary elements and that collectively represent a respective n elements of the ternary weight tensor, and applying the plurality of low resource computing operations comprises, for each integer element of the integer feature tensor: applying a first bitwise logical AND operation between the n binary elements of the first weight tensor and the n binary elements of the binary input feature tensor; applying a second bitwise logical AND operation between the n binary elements of the second weight tensor and the n binary elements of the binary input feature tensor; and generating the integer element based on a number of bits of a predetermined value included in the output of the first bitwise logical AND operation and the output of the second low bitwise logical AND operation.

According to examples of one or more of the preceding aspects, applying the plurality of low resource computing operations comprises, for each integer element of the integer feature tensor: applying a first POPCOUNT operation to count the number of bits of the predetermined value included in the output of the first bitwise logical AND operation; and applying a second POPCOUNT operation to count the number of bits of the predetermined value included in the output of the second bitwise logical AND operation; wherein generating the integer element comprises applying a subtraction operation between the outputs of the first POPCOUNT operation and the second POPCOUNT operation to output the integer element.

According to examples of one or more of the preceding aspects, the n elements of the ternary weight tensor are decomposed to into n pairs of binary elements to generate the n binary elements of the first weight tensor and the n binary elements of the second weight tensor.

According to examples of one or more of the preceding aspects, applying the plurality of low resource computing operations and performing the comparison operation are performed in a layer of a second neural network trained to perform an inference task, the method further comprising training a first neural network to perform the inference task by learning network parameters for the first neural network that include the ternary weight tensor.

According to examples of one or more of the preceding aspects, training the first neural network comprises: inferring an output tensor for each of a plurality input feature tensors of a training dataset using the network parameters; determining a cost of the network parameters based on the inferring; and updating the network parameters using gradient decent and backpropagation, wherein the inferring, determining and updating are repeated until the cost of the network parameters reaches an optimization threshold.

According to examples of one or more of the preceding aspects, the first neural network includes a layer that corresponds to the layer of the second neural network, the layer of the first neural network being configured to: apply multiplication and accumulation operations using the ternary weight tensor and a binary input feature tensor from the training dataset to generate a training integer feature tensor; and apply batch normalization, activation and binarize operations to the generated training integer feature tensor to generate a training binary output feature tensor, the batch normalization being based on a set of batch normalization parameters, wherein the network parameters that are learned include the batch normalization parameters, and the comparison threshold is a tensor of m integer threshold values computed based on the learned batch normalization parameters.

According to examples of one or more of the preceding aspects, the batch normalization parameters include a scaling factor tensor and a bias tensor, and training the first neural network comprises initializing one or more of the network parameters to maintain a variance of values within the network parameters within a target variance range.

According to examples of one or more of the preceding aspects, during training of the first neural network, the ternary weight tensor is generated by quantizing values of a corresponding real value weight tensor using a non-differentiable teranize operation, and the binarize operation applies a non-differentiable binarize operation, and during backpropagation the non-differentiable teranize operation and non-differentiable binarize operation are each approximated by respective differentiable operations.

According to a second example aspect is a processing unit that is configured to perform the method of one or more of the preceding aspects.

According a further example aspect is a processing device that includes a storage operatively connected to the processing devices and storing executable instructions that when executed by the processing device configure the processing unit to implement a computational block of a trained neural network configured to perform an inference task. The computational block is configured to: apply a plurality of low resource computing operations to generate an integer feature tensor that is equivalent to an output of multiplication and accumulation operations performed in respect of a ternary weight tensor and a binary input feature tensor; and perform a comparison operation between the generated integer feature tensor and a comparison threshold to generate a binary output feature tensor.

According to a further example embodiment is a computer program product comprising a non-transient computer readable medium that stores computer program instructions for configuring a processing unit to implement a computational block of a trained neural network configured to perform an inference task, the computational block being configured to: apply a plurality of low resource computing operations to generate an integer feature tensor that is equivalent to an output of multiplication and accumulation operations performed in respect of a ternary weight tensor and a binary input feature tensor; and perform a comparison operation between the generated integer feature tensor and a comparison threshold to generate a binary output feature tensor.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
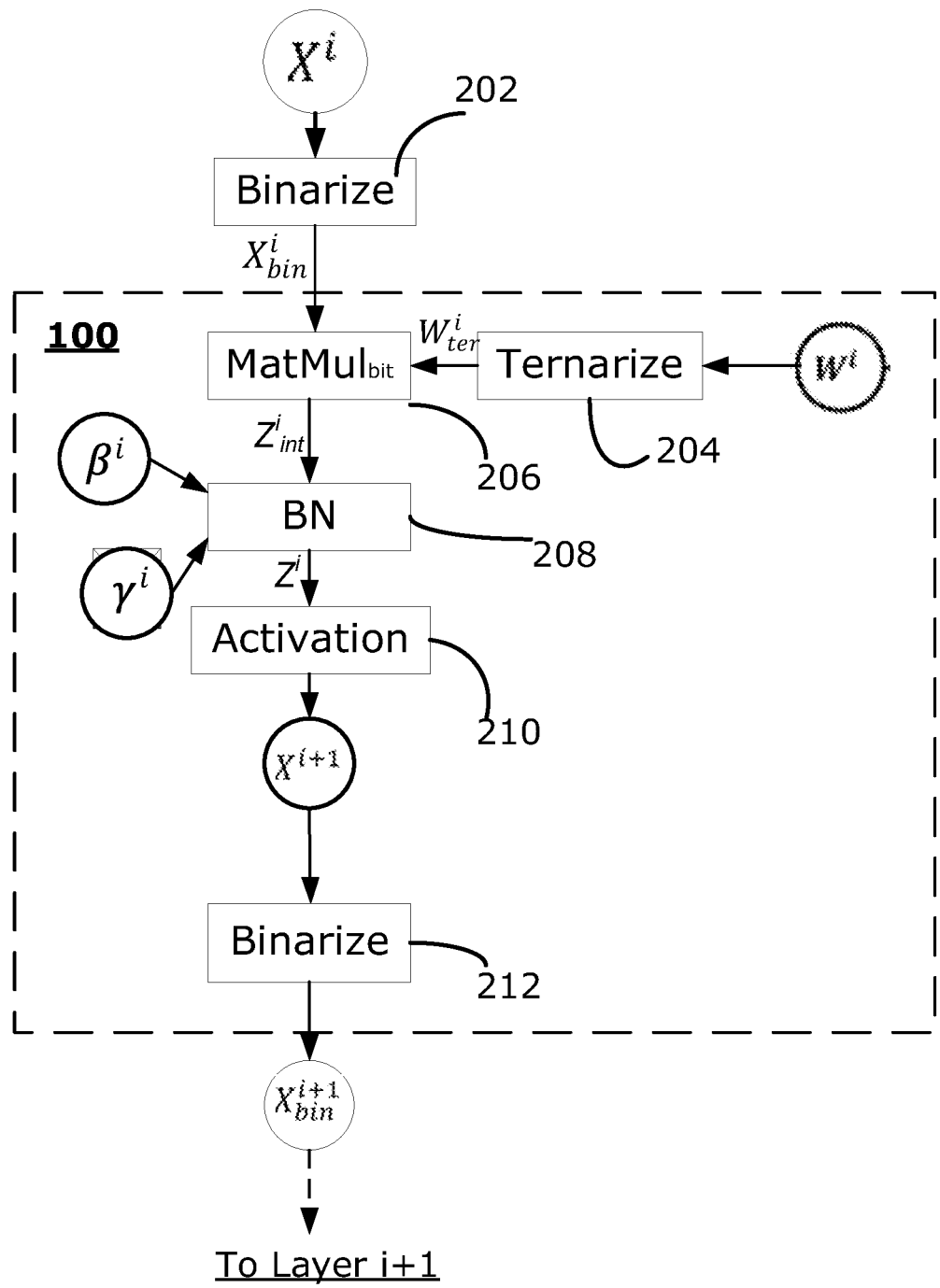
FIG. 1 is a computational graph representation of a training stage computational block that can be used to implement a layer of a NN while training an NN model in accordance with an example embodiment.

The present disclosure is directed to a neural network (NN) that includes one or more layers implemented as inference stage computational blocks that use sets of low resource computing operations to substitute for resource intensive operations used in corresponding training stage computational blocks. As used herein, an inference computational block that uses "low resource computing operations" is a computational block that performs a non-linear inference function on an input feature tensor based on a set of learned parameters without applying multiplication and accumulate (MAC) operations. In example embodiments, a low resource computing operations include basic logical and mathematical computational operations such as AND, POPCOUNT, SUBTRACTION, and Compare operations, and exclude computationally intensive operations such as matrix multiplication operations that rely on MAC operations. As used herein "tensor" refers to an array of elements, such as a vector (e.g., a one-dimensional array such as a row array or column array that includes multiple scaler feature elements) or matrix or map (e.g., a multi-dimensional array, with each dimension including multiple scaler feature elements). A "feature tensor" refers to an array of elements that represent features of an object that is being processed. For example, the object being processed could be an instance of image data, audio data, numerical data, or other form of structured or unstructured data. A "weight tensor" refers to an array of scaler weight elements, such as a weight vector (e.g., a one-dimensional array such a row array or column array that includes multiple scaler weight elements) or a weight matrix (e.g., a multi-dimensional array, with each dimension including multiple scaler weight elements). In example embodiments, a "low-bit element" refers to a scaler element that is represented using either 1 or 2 bits. In some example embodiments, a "low-bit feature element" is represented by a 1-bit value, and a "low-bit weight element" is represented by a 2-bit value. In at least some NN implementations, a inference stage computational block that applies low resource computing operations may help to reduce computational cost by one or both of simplifying compute operations and reducing memory storage requirements when compared to full procession solutions or bitwise solutions that rely on multiplication, accumulation and activation operations. The reduced computational cost may in at least some applications improve performance latency and power efficiency of a hardware device.

In example embodiments, a trained NN that includes one or more layers implemented as respective inference stage computational blocks is deployed for execution on a hardware device to perform a particular inference task. For example, an inference task could be to classify an object as falling within one class of a set of possible candidate classes. The disclosed inference stage computational block performs low resource computing operations to process an input quantized feature tensor (i.e., each feature element of the input tensor is represented as a respective 1-bit value). The inference stage computational block processes the input quantized feature tensor based on trained weight parameters defined in a 2-bit width quantized weight tensor (i.e., each weight element of the weigh tensor is represented as a 2-bit value). In at least some embodiments, a trained NN that includes one or more of the disclosed inference stage computational blocks may be deployed for execution by a computationally constrained hardware device (e.g., a device that has one or more of limited processing power, limited memory, or limited power supply). A NN that includes the inference stage computational blocks as described in the present disclosure may, in at least some applications, perform an inference task, in a manner that precisely approximates the performance of a full-precision NN, and thus mitigate conventional problems such as extensive use of MAC operations and/or decreased accuracy that may arise when existing bitwise NN structures are used to provide a discrete approximation of full-precision NNs.

In example embodiments, a NN layer that includes a inference stage computational block as described in the present disclosure can be implemented using low resource computing operations (e.g., 1-bit AND operations, 1-bit POPCOUNT operations), that can be supported using low-bit memory storage, and other low resource computing operations such as basic SUBTRACTION operations, and Compare (CMP) operations. Such a solution may allow a trained NN model, including one or more layers that each comprise a respective inference computational block, to be loaded into a high-speed cache of a processing unit of a hardware device, permitting high speed operations to be performed by a processing unit having limited computational power (e.g. micro-controllers used in resource constrained devices such as IoT devices, mobile devices and other edge devices).

In some example embodiments, when training an NN to learn the parameters for one or more training stage computational blocks, feature tensor and weight tensor quantization functions are used to generate corresponding low-bit feature and weight elements. During reverse propagation, the quantization functions are approximated by differentiable functions, such as a gradient estimator. The use of a differentiable gradient estimator can reduce gradient noise in backpropagation during training of the NN. In at least some example embodiments, when training an NN to learn parameters, scaling factors for batch normalization (BN) operations of the NN are initialized to improve accuracy of training the parameters for the deployed NN.

Computational Block for Training Purposes

FIG. 1 is a computational graph representation of a training stage computational block 100 that may be used to implement a layer of a NN during a training stage, according to example embodiments. In the presently described embodiment, training stage computational block 100 represents an $i^{th}$ fully connected layer of a NN. During a forward pass, the input to training stage computational block 100 is a quantized feature tensor $X_{bin}{}^i$, which in an example embodiment can be represented as a feature vector of n 1-bit elements (e.g. each element has a binary value of "0" or "1"), such that $X_{bin}{}^i=(x_{bin(1)}{}^i, x_{bin(2)}{}^i, \ldots, x_{bin(n)}{}^i)$ In the present disclosure, uppercase letters (e.g., "X", "W", "Z") are used to represent tensors (e.g., multi-element vectors or arrays) and lowercase letters (e.g., "x", "w", "z") are used to represent individual scaler elements that make up a tensor. The training stage computational block 100 is configured to perform a set of low-bit computational operations to process quantized feature tensor $X_{bin}{}^i$ and output a corresponding quantized feature tensor $X_{bin}{}^{i+1}$. In example embodiments, the output quantized feature tensor $X_{bin}{}^{i+1}$ can be represented as a feature vector of m 1-bit elements (e.g. each element has a binary value of "0" or "1"), such that $X_{bin}{}^{i+1}=(x_{bin(1)}{}^{i+1}, (x_{bin(2)}{}^{i+1}, \ldots, x_{bin(m)}{}^{i+1})$. As will be explained in greater detail below, the low-bit computational operations performed by training stage computational block 100 include a matrix multiplication operation ($MatMul_{bit}$) 206, a batch normalization (BN) operation 208, an activation function (e.g., PreLU) 210, and a binarize operation 212.

In some cases, layer i training stage computational block 100 is the first computational block in an NN, for example where l=1 and the training stage computational block 100 implements a first hidden layer immediately following an NN input layer. In such cases, an initial quantization operation, namely binarize operation 202, is required that quantizes the real value elements included in a real-valued input feature tensor $X^i=(x_{(1)}{}^i, x_{(2)}{}^i, \ldots, x_{(n)}{}^i)$, $X^i \in \{\mathbb{R}\}^n$ to output respective 1-bit elements of binary input feature tensor $X_{bin}{}^i=(x_{bin(1)}{}^i, x_{bin(2)}{}^i, \ldots, x_{bin(n)}{}^i)$, $X_{bin}{}^i \in \{0,1\}^n$. Binarize operation 202 quantizes each real value element x in a real valued input feature tensor $X^i$ to one of two possible values (1, 0).

In some embodiments, binarize operation 202 can be mathematically represented by the following equation (1):

$$X_{bin}^i = \text{Binarize}(X^i) = \mathbb{1}_{X>0}(X) = \begin{cases} 1 & X > 0 \\ 0 & X \le 0 \end{cases} \quad (1)$$

where, as noted above, $X^i$ represents a real-valued input feature tensor (e.g., an n-element feature vector of real values), and $X_{bin}{}^i$ represents the binarized tensor version (e.g., a corresponding n-element feature vector of 1-bit binary values).

The quantized feature tensor $X_{bin}{}^i$ is provided to the matrix multiplication operation ($MatMul_{bit}$) 206. Matrix multiplication operation ($MatMul_{bit}$) 206 performs a bitwise multiplication and accumulation operation between a ternary weight tensor $W_{ter}{}^i$ and the input quantized feature tensor $X_{bin}{}^i$ to generate an m-integer value element tensor $Z_{int}{}^i$. The ternary weight tensor $W_{ter}{}^i$ is an m×n set of 2-bit width weight parameters that are learned during training of the bitwise computational block 100. More particularly, the ternary weight tensor $W_{ter}{}^i$ is derived from real value weight tensor $W^i$, which is an m by n matrix of weight elements $w^i$ that are learned during training of the training stage computational block 100. As noted above, n is the size (e.g. number of binary elements) of binary input tensor $X_{bin}{}^i$. In the present description, m is the size of a binary output tensor $X_{bin}{}^{i+1}$ that is generated by bitwise computational block 100.

In this regard, ternarize operation 204 quantizes real-valued weight tensor $W^i \in \{\mathbb{R}\}^{m \times n}$ into ternary weight tensor $w_{ter}{}^i \in \{-1,0,+1\}^{m \times n}$. In particular, ternarize operation 204 quantizes each real-valued weight element $w_{a,b}$ into a corresponding ternary weight element $w_{ter(a,b)}$ that is one of one of three possible values (1, 0, −1) (where 1≤a≤m and 1≤b≤n).

In some embodiments, the ternary weight tensor $W_{ter}{}^i$, generated by ternarize operation 204, is mathematically represented by following equation (2):

$$W_{ter}^i = \text{Ternalize}(W^i) = \begin{cases} 1 & W > 0.5 \\ 0 & -0.5 \le W \le 0.5 \\ -1 & W < -0.5 \end{cases} \quad (2)$$

Where, as noted above, $W^i$ represents a real-valued weight tensor, and $W_{ter}{}^i$ represents a ternary weight tensor.

As explained in greater detail below, in some examples, during back propagation the ternarize operation 204 is approximated using a differentiable function such as a gradient estimator that approximates the non-differentiable discrete quantization function represented by equation (2).

Matrix multiplication operation 206 performs a bitwise matrix multiplication and accumulation operation, as represented by equations (3A) and (3B):

$$Z_{int}^i = W_{ter}^i X_{bin}^i = \begin{bmatrix} w_{ter(1,1)}^i & \cdots & w_{ter(1,n)}^i \\ \vdots & \ddots & \vdots \\ w_{ter(m,1)}^i & \cdots & w_{ter(m,n)}^i \end{bmatrix} \begin{bmatrix} x_{bin(1)}^i \\ \vdots \\ x_{bin(n)}^i \end{bmatrix} \quad (3A)$$

$$Z_{int}^i = \begin{bmatrix} w_{ter(1,1)}^i x_{bin(1)}^i + \cdots + w_{ter(1,n)}^i x_{bin(n)}^i \\ \vdots \\ w_{ter(m,1)}^i x_{bin(1)}^i + \cdots + w_{ter(m,n)}^i x_{bin(n)}^i \end{bmatrix} = \begin{bmatrix} z_{int(1)}^i \\ \vdots \\ z_{int(m)}^i \end{bmatrix} \quad (3B)$$

$w_{ter}^i \in \{-1, 0, +1\}^{m \times n}, w_{ter(\ldots)}^i \in \{-1, 0, +1\} x_{bin}^i \in \{0, 1\}^n,$ $x_{bin(.)}^i \in \{0, 1\}, Z_{int}^i \in \{\mathbb{Z}\}^m, z_{int(.)}^i \in \{\mathbb{Z}\}$ As noted above, $Z_{int}^i$ is an integer valued feature tensor $Z_{int}^i = (z_{int(1)}^i, z_{int(2)}^i, \ldots, z_{int(m)}^i), z_{int}^i \in \{\mathbb{Z}\}^m$. In the case of a fully connected layer, each integer element $z_{int(.)}^i \in \{\mathbb{Z}\}$ of the feature vector $Z_{int}^i \in \{\mathbb{Z}\}^m$ is the dot product of a set of n weights of a respective row of ternary weight tensor $W_{ter}^i$ and the n elements of the quantized feature tensor $X_{bin}^i$.

In example embodiments, integer feature tensor $Z_{int}^i \in \{\mathbb{Z}\}^m$ is provided to the BN operation 208, which can be implemented according to known batch normalization techniques. The BN operation 208 is configured by trainable BN parameters, namely a trainable bias tensor β and a trainable scaling factor tensor γ. As known in the art, batch normalization may improve training of a NN when used in place of a non-batch bias vector addition operation. The BN operation 208 can be mathematically represented by equation (4):

$$BatchNorm(x) = \gamma \frac{X - \mu_B}{\sqrt{\sigma_B^2 + \epsilon}} + \beta \quad (4)$$

where $\mu_B$ is a mini-batch mean of X (X is a group or mini batch of integer valued vectors $Z_{int}^i \in \{\mathbb{Z}\}^m$ to the BN operation, and), $\sigma_B$ is a mini-batch variance of X, γ is a trainable scaling factor tensor, β is a trainable bias tensor and ∈ is a very small number to avoid a Divide-By-Zero error. In example embodiments, each of the m outputs of the bitwise computation block will have a respective scaling factor and bias, such that γ and β are each tensors (e.g., vectors) of m elements.

In FIG. 1, the output of the BN operation 208 is real-valued feature tensor $Z^i = (z_{(1)}^i, z_{(2)}^i, \ldots, z_{(m)}^i), Z^i \in \{\mathbb{R}\}^m$, which is provided to the activation function 210. The combined operation of matric multiplication operation 206, BN operation 208 and activation function 210 can be represented mathematically by equation (5), in which a represents activation function 210:

$X^{i+1} = \sigma(BatchNorm(W_{ter}^i X_{bin}^i))$ $W_{ter}^i \in \{-1, 0, +1\}^{m \times n}, X_{bin}^i \in \{0,1\}^n, X^{i+1} \in \mathbb{R}^m \quad (5)$ The output tensor $X^{i+1}$ is a real-valued output vector, $X^{i+1} = (x_{(1)}^{i+1}, x_{(2)}^{i+1}, \ldots, x_{(m)}^{i+1}), X^{i+1} \in \{\mathbb{R}\}^m$.

In an example embodiment, the activation function σ 210 is implemented using parametric rectified liner units (PReLUs). An example of a suitable parametric ReLU is described in: (Kaiming He, Xiangyu Zhang, Shaoqing Ren, and Jian Sun. Delving deep into rectifiers: Surpassing human-level performance on imagenet classification. CoRR, abs/1502.01852, 2015). In a further example embodiment, the activation function σ 210 is implemented using Leaky ReLUs. An example of a suitable Leaky ReLU is described in: (Andrew L. Maas, Awni Y. Hannun, and Andrew Y. Ng. Rectifier nonlinearities improve neural network acoustic models. In in *ICML Workshop on Deep Learning for Audio, Speech and Language Processing*, 2013). In example embodiments, the use of Leaky ReLU or parametric ReLU as the activation function σ 210 may help to improve accuracy of backward propagation when the bitwise NN block 100 is in a training stage.

As noted above, the output tensor $X^{i+1}$ is real-valued output vector. In order to provide a binary output, binarize operation 212 is applied to quantize real-valued output vector, $X^{i+1} = (x_{(1)}^{i+1}, x_{(2)}^{i+1}, \ldots, x_m^{i+1}), X^{i+1} \in \{\mathbb{R}\}^m$ into a respective tensor of 1-bit binary elements, namely output feature tensor $X_{bin}^{i+1} = (x_{bin(1)}^{i+1}, x_{bin(2)}^{i+1}, \ldots, x_{bin(m)}^{i+1}), X_{bin}^{i+1} \in \{0,1\}^m$. Binarize operation 212 can be identical to binarize operation 202 described above.

The output feature tensor XW may be used as an input feature tensor for a subsequent NN layer (i.e., layer i+1) that is implemented using a further computational block 100.

Figure 2:
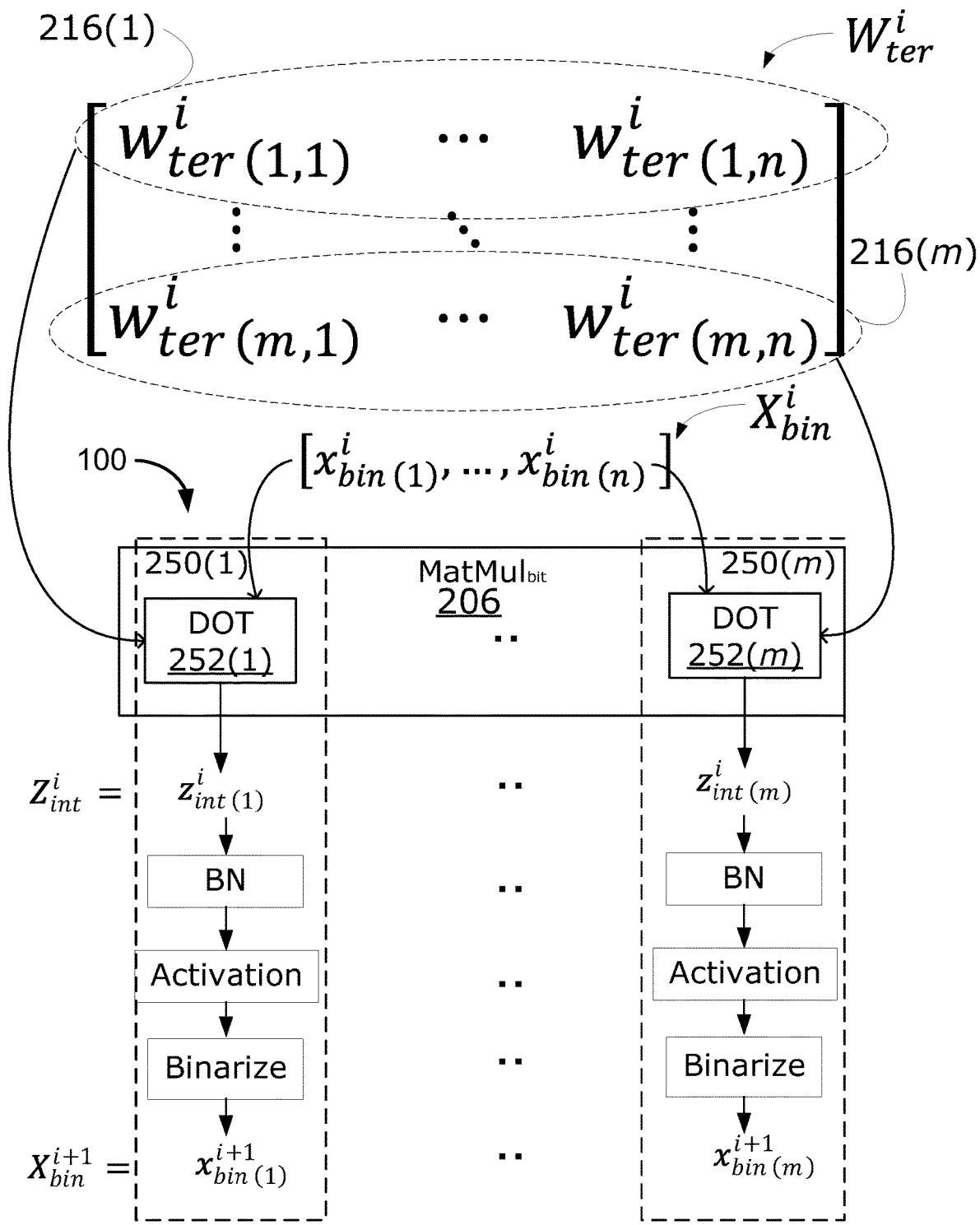
FIG. 2 illustrates a further representation of the training stage computational block of FIG. 1, together with an example of a ternary weight tensor in accordance with example embodiments.

Referring to FIG. 2, training stage computational block 100 can be considered as a group of "m" neurons or computational units 250(1) to 250(m) that collectively form the $i^{th}$ fully connected layer of an NN. As indicated in FIG. 2, matrix multiplication operation 206 includes m dot product operations 252(1) to 252(m). In this regard, each computational unit 250(a) (where a is an integer from 1 to m) computes a respective integer feature element $z_{int(a)}^i$ that is the dot product of a respective n-element weight vector that is defined by one of the "m" rows of the ternary weight tensor $W_{ter}^i$ with the n-element quantized input feature tensor $X_{bin}^i$. Thus, in a fully connected layer, a different set of n weight elements $w_{ter(a,1)}^i$ to $w_{ter(a,n)}^i$ is applied at each of the dot product operations 252(1) to 252(m) to the same set of n 1-bit binary input feature elements $x_{bin(1)}^i$ to $x_{bin(n)}^i$. By way of example, as illustrated in FIG. 2, the integer feature element $z_{int(1)}^i$ is the dot product of the first row 216(1) of m row by n column ternary weight tensor $W_{ter}^i$ and the n element quantized feature tensor $X_{bin}^i$. The integer feature element $z_{int(m)}^i$ is the dot product of the last row 216(m) of ternary weight tensor $W_{ter}^i$ and the n element quantized feature tensor $X_{bin}^i$. The integer feature tensor includes the m integer elements $z_{int(1)}^i$ to $z_{int(m)}^i$. Each of the m integer elements $z_{int(1)}^i$ to $z_{int(m)}^i$ are respectively subjected to batch normalization, activation and binarize operations, resulting in the output binary vector $X_{bin}^{i+1} = (x_{bin(1)}^{i+1}, x_{bin(2)}^{i+1}, \ldots, x_{bin(m)}^{i+1}), X_{bin}^{i+1} \in \{0,1\}^m$. Each of the binary feature elements $x_{bin(a)}^{i+1}$ is generated by a respective computational unit 250(a)

Forward propagation by each computational unit 250(a) of training stage computational block 100 can be generally represented by the function shown in equation (6A):

$x_{bin(a)}^{i+1} = \text{Binarize}(\sigma(W_{ter(a)}^i X_{bin}^i + b_{(a)}^i)) \quad (6A)$ Where "a" is an integer between 1 and m, $W_{ter(a)}^i$ is a ternary weight vector that made of the n weight elements of the $a^{th}$ row of ternary weight tensor $W_{ter(a)}^i$, and $b_{(a)}^i$ represents the elements of scaling factor tensor γ and bias tensor β that correspond to computational unit 250(a)

As shown in FIGS. 1 and 2, when the bitwise computational block 100 performs forward propagation, the output binary feature tensor $X_{bin}^{i+1}$ of the training stage computational block 100 can be mathematically represented by following equation (6B):

$$X_{bin}^{i+1} = \text{Binarize}(\sigma(\text{BatchNorm}(W_{ter}^{i}X_{bin}^{i})))$$

$$W_{ter}^{i} \in \{-1, 0, +1\}^{m \times n}, X_{bin}^{i} \in \{0,1\}^{n}, X_{bin}^{i+1} \in \{0,1\}^{m} \quad (6B)$$

Where BatchNorm is the BN operation 208, σ is the activation function 210, and Binarize is the binarize operation 202.

In example embodiments, the training stage computational block 100 is trained using supervised training to learn a non-linear function $X_{bin}^{i+1} = f(X_{bin}^{i})$. In particular, a set of parameters, including weights elements $w^{i}$ in weight tensor $W^{i}$, scaling factor elements in trainable scaling factor tensor $\gamma^{i}$, and bias elements in a trainable bias tensor $\beta^{i}$ are learned through an iterative training process of measuring NN performance in respect of a training dataset for a set of parameters, determining a cost of the parameters, updating the parameters using a backpropagation, and repeating until an optimal set of parameters is achieved. Further training details will be described below.

Once the training stage computational block 100 has been trained, the learned parameter tensors $W^{i}$, $\gamma^{i}$, $\beta^{i}$ can be used with any computational block that has the same structure as training stage computational block 100 to implement non-linear function $X_{bin}^{i+1} = f(X_{bin}^{i})$.

Computational Block for Inference Purposes

Although the training stage computational block 100 as shown in FIG. 1 may eliminate some high-bit computations during NN training, the structure of training stage computational block 100 still relies on a large number of MAC operations (e.g., matrix multiplication operations), as well as high-bit BN operations and activation functions, that may be computationally and memory intensive. Thus, training stage computational block 100 may not be appropriate to apply for on-going inference operations in respect of new data when deployed on computationally constrained devices such as edge devices.

Accordingly, example embodiments of the present disclosure describe an alternative computational block structure that can be used to implement the non-linear function $X_{bin}^{i+1} = f(X_{bin}^{i})$ based on the parameters learned by training stage computational block 100. In example embodiments, the alternative computational block structure is configured to replace the computational operations of training stage computational block 100 with a plurality of low resource computing operations. For example, after training (i.e., when reverse propagation is no longer required), for inference purposes the matrix multiplication operation 206 can alternatively be represented as an output of a plurality of low resource computing operations between the input quantized feature tensor $X_{bin}^{i}$ and the ternary weight tensor $W_{ter}^{i}$. In particular, a plurality of low resource computing operations can be applied to generate integer feature tensor $Z_{int}^{i}$ that is equivalent to the output of the multiplication and accumulation operations performed by matrix multiplication operation 206 in respect of the ternary weight tensor $W_{ter}^{i}$ and a binary input feature tensor $X_{bin}^{i}$.

Figure 3:
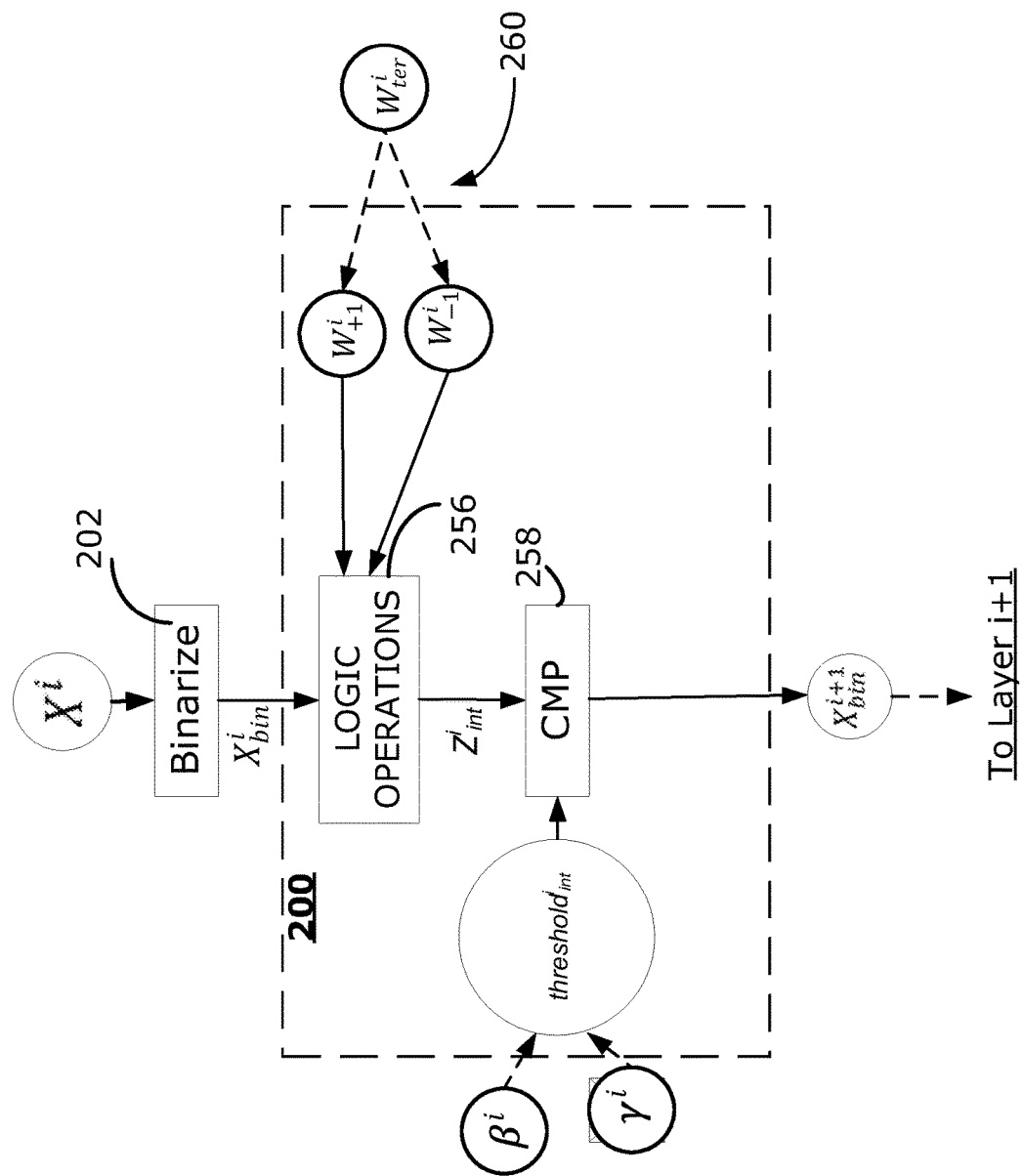
FIG. 3 is a computational graph representation of an inference stage computational block that can be used to implement a trained layer of a NN in accordance with an example embodiment.

In this regard, FIG. 3 shows an example embodiment of an inference stage computational block 200 that can be used with the parameters learned during training of training stage computational block 100. Inference stage computational block 200 replaces the matrix multiplication operation 206 with a set of low resource computing operations 256 described below. Furthermore, inference stage computational block 200 replaces the BN operation 208, activation operation 210 and binarize operation 212 with a simple Boolean compare operation 258, described in greater detail below.

In above described training stage computational block 100, the input quantized feature map tensor $X_{bin}^{i}$ and the ternary weight tensor $W_{ter}^{i}$ are provided to matrix multiplication operation 206, which applies multiplication and accumulation operations, to generate intermediate output tensor $Z_{int}^{i} \in \{\mathbb{Z}\}^{m}$, mathematically represented by equations (3A), (3B) as noted above.

Figure 4:
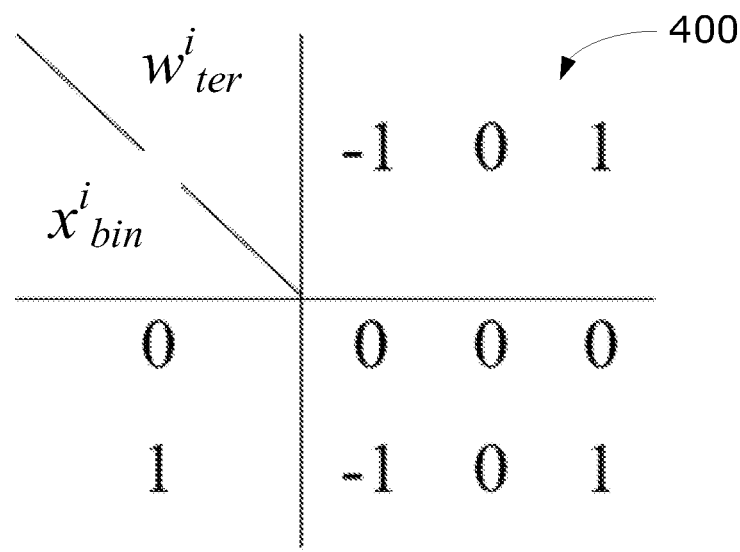
FIG. 4 is a truth table representation of bitwise operations.
Figure 5:
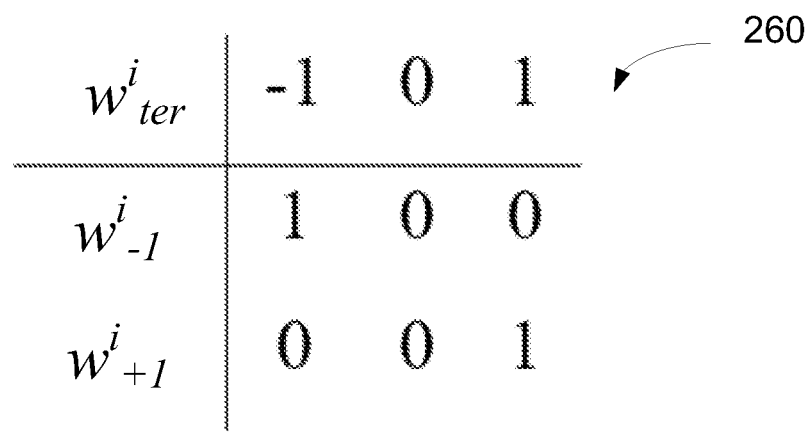
FIG. 5 illustrates two 1-bit weight tensors representing a ternary weight tensor.

In the case of the training stage computational block 100, given that $W_{ter}^{i} \in \{-1, 0, +1\}^{m,n}$ and $X_{bin}^{i} \in \{0,1\}^{n}$, FIG. 4 illustrates an element-wise truth table 400 for the scaler product of $w_{ter(a,b)}^{i} X_{bin(n)}^{i}$ (where $1 \leq a \leq m$, $1 \leq b \leq n$). In order use the low resource computing operations 256 of the inference stage computational block 200, the learned values of ternary weight tensor $W_{ter}^{i}$ are each decomposed using a mapping function 260 to a respective pair of binary values. In this regard, FIG. 5 illustrates the operation of mapping function 260, wherein each weight element $w_{ter(a,b)}^{i}$ is decomposed into two one-bit elements, denoted as $w_{-1}^{i}$ and $w_{+1}^{i}$. For example, $w_{ter}^{i} = -1$ can be mapped to $w_{-1}^{i} = 1$ and $w_{+1}^{i} = 0$; $w_{ter}^{i} = 0$ can be mapped to $w_{-1}^{i} = 0$ and $w_{+1}^{i} = 0$; and $w'ter = 1$ can be mapped to $w_{-1}^{i} = 0$ and $w_{+1}^{i} = 1$. The 1-bit positive weight elements $w_{+1}^{i}$ collectively can be represented as 1-bit positive weight tensor $W_{+1}^{i}$, and the 1-bit negative weight elements $w_{-1}^{i}$ collectively can be represented as a 1-bit negative weight tensor $W_{-1}^{i}$. Accordingly, equations (3A), (3B) can be equated to inference stage operations between the 1-bit positive weight tensor $W_{+1}^{i} \in \{0,1\}^{m \times n}$ and the input quantized feature tensor $X_{bin}^{i} \in \{0,1\}^{n}$, and inference stage operations between the 1-bit negative weight tensor $W_{-1}^{i} \in \{0,1\}^{m \times n}$ and the input quantized feature tensor $X_{bin}^{i} \in \{0,1\}^{n}$.

Thus, the ternary weight tensor $W_{ter}^{i}$ learned in respect of training stage computational block 100 is decomposed by mapping function 260 operation into positive weight tensor $W_{+1}^{i}$ and negative weight tensor $W_{-1}^{i}$, which are stored as the trained weight parameters for inference stage computational block 200. Low resource computing operations 256 perform a set of bitwise logic and basic mathematical operations between 1-bit positive weight tensor $W_{+1}^{i}$ and the binary input feature map tensor $X_{bin}^{i}$, and as set of logic operations between the 1-bit negative weight tensor $W_{-1}^{i}$ and the binary input feature map tensor $X_{bin}^{i}$.

Figure 6:
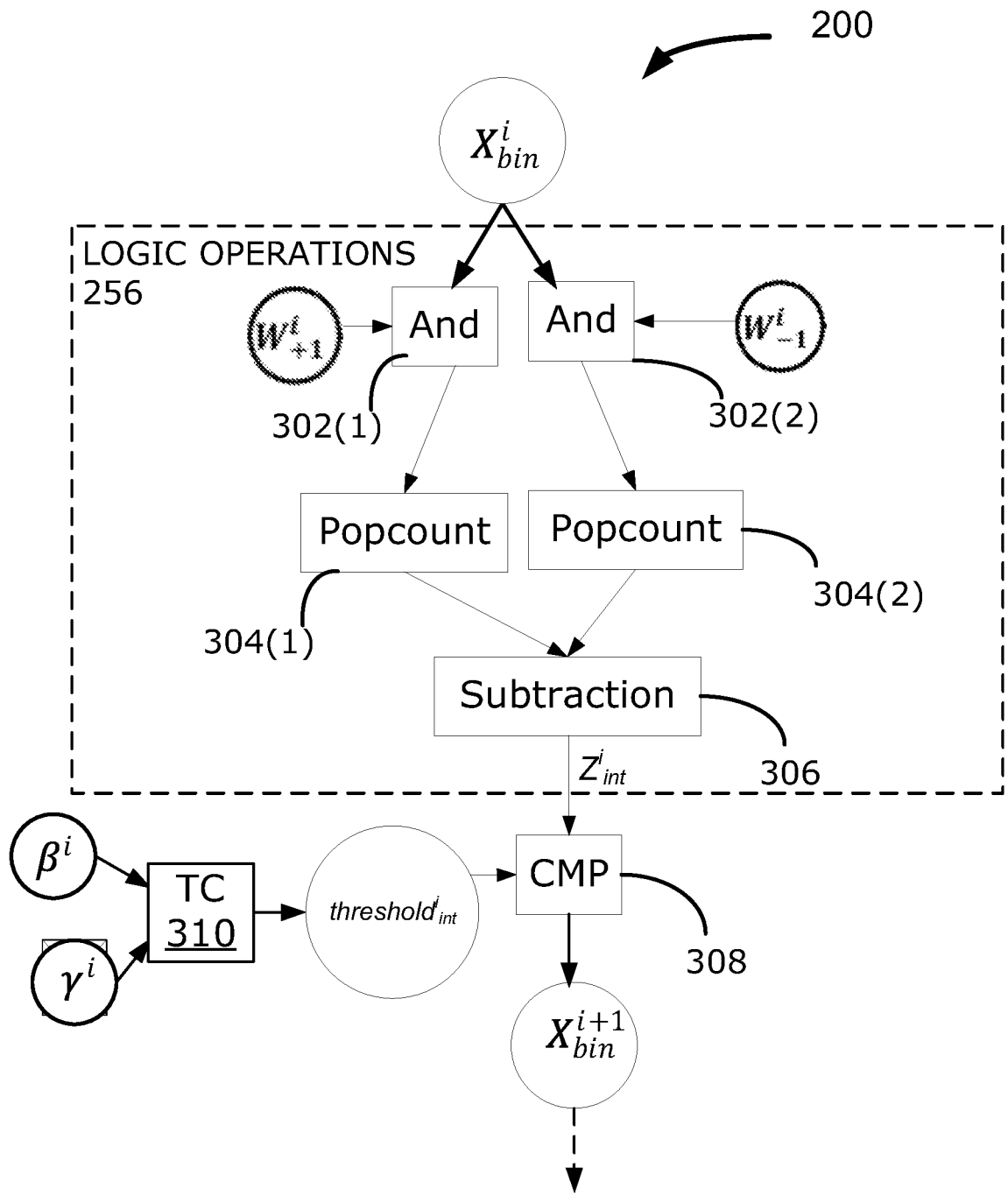
FIG. 6 is a block diagram of low resource computing operations used to implement the inference stage computational block of FIG. 2.

Low resource computing operations 256 will be explained in greater detail with reference to FIG. 6. Low resource computing operations 256 includes two AND operations 302(1), 301(2) (generically referred to as AND operation 302), two POPCOUNT operations 304(1), 304(2) (generically referred to as POPCOUNT operation 304), and a SUBTRACTION operation 306. In particular, using the 1-bit positive weight tensor $W_{+1}^{i}$ and the 1-bit negative weight tensor $W_{-1}^{i}$ to represent the ternary weight tensor $W_{ter}^{i}$, the matrix multiplication ($\text{Matmul}_{bit}$) operation 206 performed between $W_{ter}^{i}$ and $X_{bin}^{i}$ can be substituted by the plurality of low resource computing operations (AND 302, POPCOUNT 304, SUBTRACTION 306) as represented in the following equation (7).

$$Z_{int}^{i} = W_{ter}^{i} X_{bin}$$

$$Z_{int}^{i} = \text{POPCOUNT}(\text{AND}(X_{bin}^{i}, W_{+1}^{i})) - \text{POPCOUNT}(\text{AND}(X_{bin}^{i}, W_{-1}^{i}))$$

$$W_{ter}^{i} \in \{-1, 0, +1\}^{m \times n}, W_{+1}^{i} \in \{0,1\}^{m \times n} W_{-1}^{i} \in \{0,1\}^{m \times n} W_{-1}^{i} \in \{0,1\}^{m \times n}, X_{bin}^{i} \in \{0,1\}^{n}, Z_{int}^{i} \in \{\mathbb{Z}\}^{m} \quad (7)$$

where: (i) each AND( ) corresponds to a respective one of the AND operations 302(1) and 302(2) of FIG. 6; (ii) each POPCOUNT( ) corresponds to a respective bitwise popcount operation 304(1), 304(2), where popcount operation 304(1) counts the number of 1s in the AND($X_{bin}^i, W_{+1}^i$) and popcount operation 304(2) counts number of 1s in the AND($X_{bin}^i, W_{-1}^i$), where $W_{+1}^i$ is the positive weight tensor and $W_{-1}^i$ is the negative weight tensor; and (iii) $Z_{int}^i$ is an output tensor of integers (e.g., an output vector of m integer elements), resulting from the subtraction operation 306.

As illustrated in equation (7), the generated integer feature tensor $Z_{int}^i$ comprises a set of m integer elements ($z_{int(1)}^i, \ldots, z_{int(m)}^i$) each integer element $z_{int(a)}^i$ having a value that is the equivalent of a dot product of a set of n ternary elements ($w_{ter(a,1)}^i \ldots, w_{ter(a,n)}^i$) of the ternary weight tensor $W_{ter}^i$ and a set of n binary elements ($x_{bin(1)}^i \ldots, x_{bin(n)}^i$) of the binary input feature tensor $X_{bin}^i$. For each integer element $z_{int(a)}^i$, the plurality of low resource computing operations 256 are applied using first and second weight tensors that each include n binary elements, namely n binary elements of positive weight tensor $W_{+1}^i \in \{0,1\}^{m \times n}$ (e.g., $a^{th}$ row ($w_{+1(a,1)}^i \ldots, w_{+1(a,n)}^i$) and n binary elements of negative weight tesnor $W_{-1}^i \in \{0,1\}^{m \times n}$ (e.g., $a^{th}$ row ($w_{-1(a,1)}^i \ldots, w_{-1(a,n)}^i$) that collectively represent a respective n elements of the ternary weight tensor $W_{ter}^i$ (e.g. $a^{th}$ row ($w_{ter(a,1)}^i \ldots, w_{ter(a,n)}^i$)) Applying the plurality of low resource computing operations 256 comprises, for each integer element $z_{int(a)}^i$: (i) applying a first bitwise logical AND operation (e.g., AND 302(1)) between the n binary elements ($w_{+1(a,1)}^i \ldots, w_{+1(a,n)}^i$) (of the positive weight tensor $W_{+1}^i$ and the n binary elements ($x_{bin(1)}^i \ldots, x_{bin(n)}^i$) of the binary input feature tensor $X_{bin}^i$; (ii) applying a second bitwise logical AND operation (e.g., AND 302(2)) between the n binary elements ($w_{-1(a,1)}^i \ldots, w_{-1(a,n)}^i$) of the negative weight tensor $W_{-1}^i$ and the n binary elements ($x_{bin(1)}^i \ldots, x_{bin(n)}^i$) of the binary input feature tensor $X_{bin}^i$; and (iii) generating the integer element $z_{int(a)}^i$ based on a number of bits of a predetermined value (e.g. number of "1"s) included in the output of the first AND operation and the output of the second AND operation. In particular, as indicated in FIG. 6 and equation (7), the calculation of each integer element $z_{int(a)}^i$ of integer feature tensor $Z_{int}^i$ includes: applying first POPCOUNT operation 304(1) to count the number of bits of the predetermined value (e.g. number of "1"s) included in the output of the first AND operation 302(1); and applying second POPCOUNT operation 304(2) to count the number of bits of the predetermined value included in the output of the second AND operation 302(2). The integer element $z_{int(a)}^i$ is then generating by applying a SUBTRACTION operation 306 between the outputs of the first POPCOUNT operation 304(1) and the second POPCOUNT operation 304(2), resulting in the integer element $z_{int(a)}^i$. In example embodiments, SUBTRACTION operation 306 performs a simple integer subtraction. Compared to floating point subtraction, integer subtraction may use less computational power and memory. In some examples, SUBTRACTION operation 306 is implemented by using an addition operation to add the output of POPCOUNT operation 304(1) with a changes sign version the output of POPCOUNT operation 304(2). The low resource computing operations 256 are respectively performed for all m rows of positive weight tensor $W_{+1}^i$ and negative weight tensor $W_{-1}^i$, resulting in integer feature tensor $Z_{int}^i$.

For illustrative purposes, a comparative example of the operation of binary matrix multiplication operation 206 (e.g., $W_{ter}^i X_{bin}^i$) and low resource computing operations 256 will be provided in the context of an $a^{th}$ neuron or computational unit of the training stage computational block 100 and inference stage computational block 200. In the illustrated example, n=4, and $X_{bin}^i=(0,1,1,1)$, and the ternary weight vector $w_{ter(a)}^i=(-1,0,1,1)$, where ternary weight vector $W_{ter(a)}^i$ corresponds to the $a^{th}$ row of ternary weigh tensor $W_{ter}^i \in \{-1,0,+1\}^{m \times n}$. Accordingly, the integer feature element $z_{int(a)}^i$ of the $a^{th}$ neuron (e.g., computational unit 250(a)) of training stage computational block 100 is the dot product $z_{int(a)}^i = W_{ter(a)}^i X_{bin}^i = ((-1 \times 0)+(0 \times 1)+(1 \times 1)+(1 \times 1))=2$.

In the case of low resource computing operations 256 operations 256, $W_{ter(a)}^i=(-1,0,1,1)$ decomposes into: $W_{-1(a)}^i=(1,0,0,0)$ and $W_{+1(a)}^i=(0,0,1,1)$. The result of AND ($Xbin^i, W_{-1(a)}^i$) is (0,0,0,0) and the result of AND $$(X_{bin}^i, W_{\mp(a)}^i)$$

is (0,0,1,1). The result of POPCOUNT (AND($X_{bin}^i, W_{i-1}^i$)) is 0, the result of POPCOUNT (AND($X_{bin}^i, W_{+1}^i$)) is 2. Thus, the intermediate integer output of the at neuron (e.g. computational unit that corresponds to unit 250(a)) of inference stage computational block 200 is $z_{int(a)}^i=2-0=2$.

Thus, the above example illustrates binary matrix multiplication operation 206 and low resource computing operations 256 will generate the same output, integer feature tensor $Z_{int}^i \in \{\mathbb{Z}\}^m$.

In inference stage computational block 200, the integer feature tensor $Z_{int}^i$ is a vector of m integers, which is then converted to binary output feature vector $X_{bin}^{i+1} \in \{0,1\}^m$ by a compare operation 308. In example embodiments, compare operation 308 may for example be implemented using a CMP(x,y) instruction that returns the Boolean result of whether integer x is smaller than integer y. For example, compare operation 308 may be configured to transform each of the integer values $z_{int}^i \in \{\mathbb{Z}\}$ of tensor $Z_{int}^i \in \{\mathbb{Z}\}^m$ to a respective binary value element $x_{bin}^{i+1} \in \{0,1\}$ of output quantized feature tensor $X_{bin}^{i+1} \in \{0,1\}^m$ as represented by equation (8):

$$X_{bin}^{i+1} = \begin{cases} 1 & Z_{int}^i > \text{threshold}_{int}^i \\ 0 & Z_{int}^i \leq \text{threshold}_{int}^i \end{cases} \quad (8)$$

$\text{threshold}_{int}^i \in \{\mathbb{Z}\}^m$

As noted above, in inference stage computational block 200, compare operation 308 replaces BN operation 208, activation operation 210 and binarize operation 212 of training stage computational block 100. As will now be explained over the following paragraphs, the value of the comparison threshold ($\text{threshold}_{int}^i$) is calculated for the inference stage computational block 200 by a threshold calculation function 310 based on the trainable scaling factor $\gamma^i$ and trainable bias $\beta^i$ parameter values, learned during training of the training stage computational block 100.

Referring to FIG. 1 again, in the training stage, the output tensor $X_{bin}^{i+1}$ of the training stage computational block 100 is calculated by implementing BN operation 208, activation function 210, and binarize operation 212 as follows:

$$X_{bin}^{i+1} = \text{Binarize}(\sigma(BatchNorm(Z^i))) = \begin{cases} 1 & \sigma(BatchNorm(Z^i)) > 0 \\ 0 & \sigma(BatchNorm(Z^i)) \leq 0 \end{cases} \quad (9)$$

The determination of whether output of the activation function σ 210 is positive or negative will be based on whether the output of the BatchNorm($Z^i$) (e.g., BN operation 208) is positive or negative. Thus, equation (9) can be transformed to following equation (10) by incorporating the BatchNorm equation (4) discussed above into the equation (9):

$$X_{bin}^{i+1} = \text{Binarize}(\sigma(BatchNorm(Z^i))) = \begin{cases} 1 & \sigma(BatchNorm(Z^i)) > 0 \\ 0 & \sigma(BatchNorm(Z^i)) \leq 0 \end{cases} \quad (10)$$

$$= \begin{cases} 1 & BatchNorm(Z^i) > 0 \\ 0 & BatchNorm(Z^i) \leq 0 \end{cases} = \begin{cases} 1 & \gamma^i \frac{z^i - \mu_B}{\sqrt{\sigma_B^2 + \epsilon}} + \beta^i > 0 \\ 0 & \gamma^i \frac{z^i - \mu_B}{\sqrt{\sigma_B^2 + \epsilon}} + \beta^i \leq 0 \end{cases}$$

where, as noted above, scaling factor tensor $\gamma^i$ and bias tensor $\beta^i$ are learned parameters of the BN operation 208. The parameter $\mu_B$ (mini-batch mean of X, where X is a group or mini batch of intermediate vectors $Z_{int}^i \in \{\mathbb{Z}\}^m$ provided to the BN operation 208) and parameter $\sigma_B$ (mini-batch variance of X) of the BN operation 208 are also known from the training of bitwise computational block 100. As noted above, the value of E is predefined as a small constant to avoid a divide by zero error during forward propagation.

Solving for the threshold case of $$\gamma^i \frac{Z^i - \mu_B}{\sqrt{\sigma_B^2 + \epsilon}} + \beta^i = 0,$$

the value of $Z^i$ can be represented by the following equation (11):

$$Z^i = \mu_B - \beta^i \frac{\sqrt{\sigma_B^2 + \epsilon}}{\gamma^i} = \text{threshold}^i \quad (11)$$

Accordingly, the equation $$\mu_B - \beta^i \frac{\sqrt{\sigma_B^2 + \epsilon}}{\gamma^i}$$

defines a threshold tensor (e.g. threshold$^i$) for generating the binary output feature map tensor $X_{bin}^{i+1}$, of an $i^{th}$ computational block of a NN. As demonstrated in equation (11), the value for threshold$^i$ can be calculated based on the parameters $\mu_B$, $\beta^i$, $\sigma_B$, $\gamma^i$ of the BN operation 208 that were learned during training of bitwise computational operation 100. As noted above, the value of E is predefined as a small constant to avoid a divide by zero error during forward propagation.

For all cases where the elements of scaling factor tensor $\gamma^i$ for the BN operation 208 are greater than zero, the output tensor $X_{bin}^{i+1}$ of the training stage computational block 100 that is denoted by the equation (11) can be described by following equation (13):

$$X_{bin}^{i+1} = \text{Binarize}(\sigma(BatchNorm(Z^i))) = \begin{cases} 1 & Z^i > \text{threshold}^i \\ 0 & Z^i \leq \text{threshold}^i \end{cases} \quad (13)$$

where scaling factor tensor $\gamma^i > 0$.

In example embodiments, in order to ensure the scaling factor tensor $\gamma^i$ is greater than zero, in cases where the trained scaling factor element in scaling factor vector $\gamma^i$ is less than zero (e.g., $\gamma_{(a)}^i < 0$), both the scaling factor element $\gamma_{(a)}^i$ and the corresponding row $w_{ter(a,1)}^i$ to $w_{ter(a,n)}^i$ of the ternary weight tensor $W_{ter}^i$ are each multiplied by −1 before being used to compute parameters for inference computational model 200.

It will be noted that in equation (8), the elements of vector threshold$_{int}^i$ are integers. In this regard, with reference to FIG. 6, consider the case where a first scaling factor $\alpha_n^i$, is applied to the output of negative weight tensor popcount operation 304(1) and a second scaling factor $\alpha_p^i$ is applied to the output of negative weight tensor popcount operation 304(2), such that the output of subtraction operation 306 can be represented by equation (14):

$$Z_{int}^i = \alpha_p^i \text{POPCOUNT}(\text{AND}(X_{bin}^i, W_{+1}^i)) - \alpha_n^i \text{POPCOUNT}(\text{AND}(X_{bin}^i, W_{-1}^i))$$

$$W_{ter}^i \in \{-1, 0, +1\}^{m \times n}, W_{+1}^i \in \{0,1\}^{m \times n}, W_{-1}^i \in \{0,1\}^{m \times n},$$

$$X_{bin}^i \in \{0,1\}^n, Z^i \in \{\mathbb{Z}\}^m \quad (14)$$

In equations (7) and (8), $Z_{int}^i$ is a tensor of m integers, whereas $Z^i$ of equation (14) is a tensor of m real numbers. However, when $\alpha_p^i$ and $\alpha_n^i$ are each equal to 1, the tensor $Z^i$ of equation (14) equals the tensor $Z_{int}^i$ of equation (7) such that the output of the subtraction operation 306 is integer-valued tensor $Z_{int}^i$ of equation (7). In the case of low resource computing operations 256, $\alpha_p^i$ and $\alpha_n^i$ are deemed to be equal to 1 as the intermediate output of $Z_{int}^i$ is always a vector of integers (i.e., $Z_{int}^i \in \{\mathbb{Z}\}^m$). Accordingly, the value of threshold$^i$ (which is calculated in the manner described below) can in example embodiments be rounded to an integer, such that threshold$_{int}^i = \lfloor \text{threshold}^i \rfloor$. Using an integer value for the threshold can reduce the amount of computational power and memory required to perform the compare operation 308 relative to using a real value threshold.

In some embodiments, one or more of the parameters $\mu_B$, $\beta^i$, $\sigma_B^2$, $\gamma^i$ are uniquely trained for each of the m computational units that form training stage computational block 100, such that threshold$_{int}^i$ calculated by threshold calculation function 310 for an inference stage computational block 200 is an m-dimensional vector threshold$_{int}^i \in \{\mathbb{Z}\}^m$ of individual integer threshold values that are respectively applied at the m neurons or computational units of the inference stage computational block 200.

Training and Deployment

Figure 7:
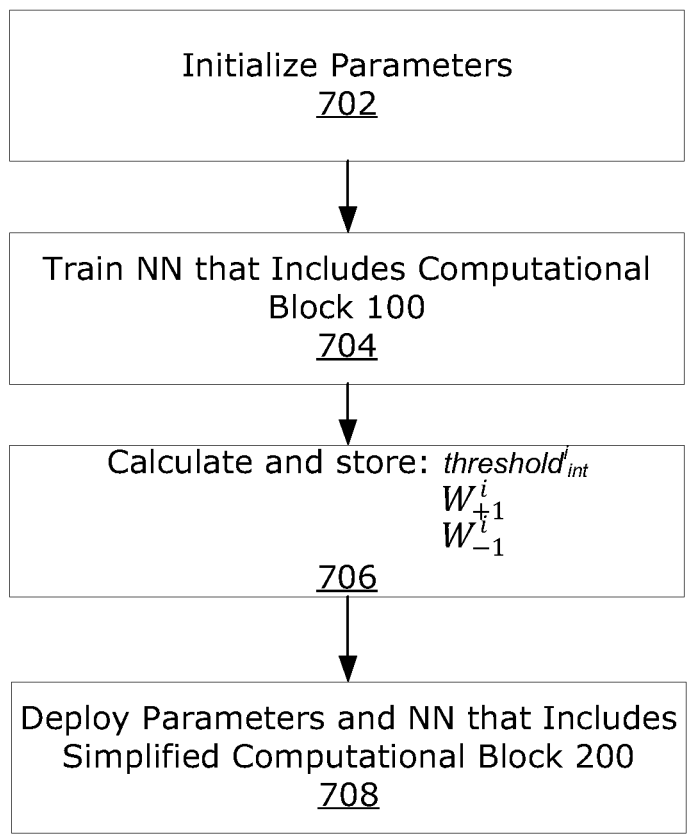
FIG. 7 illustrates an example method to perform an inference task using the low resource computing operations of FIG. 3B in accordance with example embodiments.

FIG. 7 is a flow chart illustrating an example method 700 for training an NN that includes training stage computational block 100 and deploying and trained NN that includes inference stage computational block 200.

As indicated in FIG. 7, method 700 includes a pre-training action (Action 702) of initializing the network parameters (e.g., initial weight tensor $W^i$, scaling factor tensor $\gamma^i$ and bias tensor $\beta^i$ for training stage computational block 100. In example embodiments, the network parameters are initialized to maintain a variance of the output binary tensor $X_{bin}^{i+1}$ and a variance of the binary input tensor $X_{bin}^i$ of training stage computational block 100 within a target variance range by controlling the variance of initial weight tensor $W^i$, scaling factor tensor $\gamma^i$ and bias tensor $\beta^i$. In some embodiments where a NN includes a computational block 100 having a BN operation 208, the scaling factor tensor $\gamma$ of the BN operation 208 is initialized as following equation (15):

$$\gamma = \sqrt{\frac{3}{n}} \quad (15)$$

where n is number of feature elements in the input tensor $X_{bin}^i$ (which is also equal to the number of weight elements included in a row of initial weight tensor $W^i$). Accordingly, the initial elements of the scaling factor tensor are scaled based on the number of element-wise multiplications occur at each respective neuron (e.g. computational unit) of the bit-wise computational block 100.

In some example embodiments where a ReLU activation function is used to implement activation function 210, all weight elements of the initial weight tensor $W^i$ are initialized with random values having a uniform distribution between 1.5 and +1.5 so the corresponding ternary weight tensor $W_{ter}^i$ will have equal number of −1, 0 and +1 values.

The initialization of the weight elements in the ternary weight tensor $W_{ter}^i$ or/and scaling elements of scaling factor tensor $\gamma^i$ may reduce the time required to train the NN and may improve performance of the trained NN during a post training inference stage.

Once the network parameters have been initialized, training stage computational block 100, and the NN that it forms a layer of, are trained using supervised training to learn a non-linear function $X_{bin}^{i+1} = f(X_{bin}^i)$ (Action 704). In particular, a set of network parameters, including weights elements w in weight tensor $W^i$, trainable scaling elements of scaling factor tensor $\gamma^i$, and a trainable bias elements of bias tensor $\beta^i$ are learned through an iterative training process that includes: inferring an output tensor for each of a plurality of input feature tensors of a training dataset using the set of network parameters, determining a cost of the network parameters based on the inferring performed by the NN, updating the network parameters of the respective layers (including parameters of the bitwise computational block 100) using gradient decent and backpropagation, and repeating the inferring, cost determining and parameter updating until the cost of the network parameters reaches an optimization threshold (e.g., until an optimal set of network parameters that minimizes the cost is achieved).

As described above, the feature tensor and weight tensor quantization operations (e.g. binarize operation 212 and ternarize operation 204) are mathematically represented by equations (1) and (2) respectively. Equations (1) and (2) are not differentiable functions. This may pose a challenge for backward propagation during training of bitwise computational block 100. Accordingly, in some embodiments, differentiable functions, namely a gradient estimator functions, are used to approximate the discrete functions of binarize operation 212 and ternarize operation 204 during backward propagation. In some embodiments, the differentiable function used to represent the discrete function of the feature tensor and weight tensor quantization operations may approximated by a Gaussian function $\Gamma_\varepsilon(x)$ represented by following equation (16):

$$\delta_\varepsilon(x) = \frac{1}{|\varepsilon|\sqrt{\pi}} e^{-(\frac{x}{\varepsilon})^2} \quad (16)$$

where $\varepsilon$ is a hyper-parameter to control a shape of the differentiable Gaussian function $\delta_\varepsilon(x)$. The differentiable Gaussian function $\delta_\varepsilon(x)$ represented by the equation (16) is referred to zero-centered Gaussian distribution density function.

Figure 8:
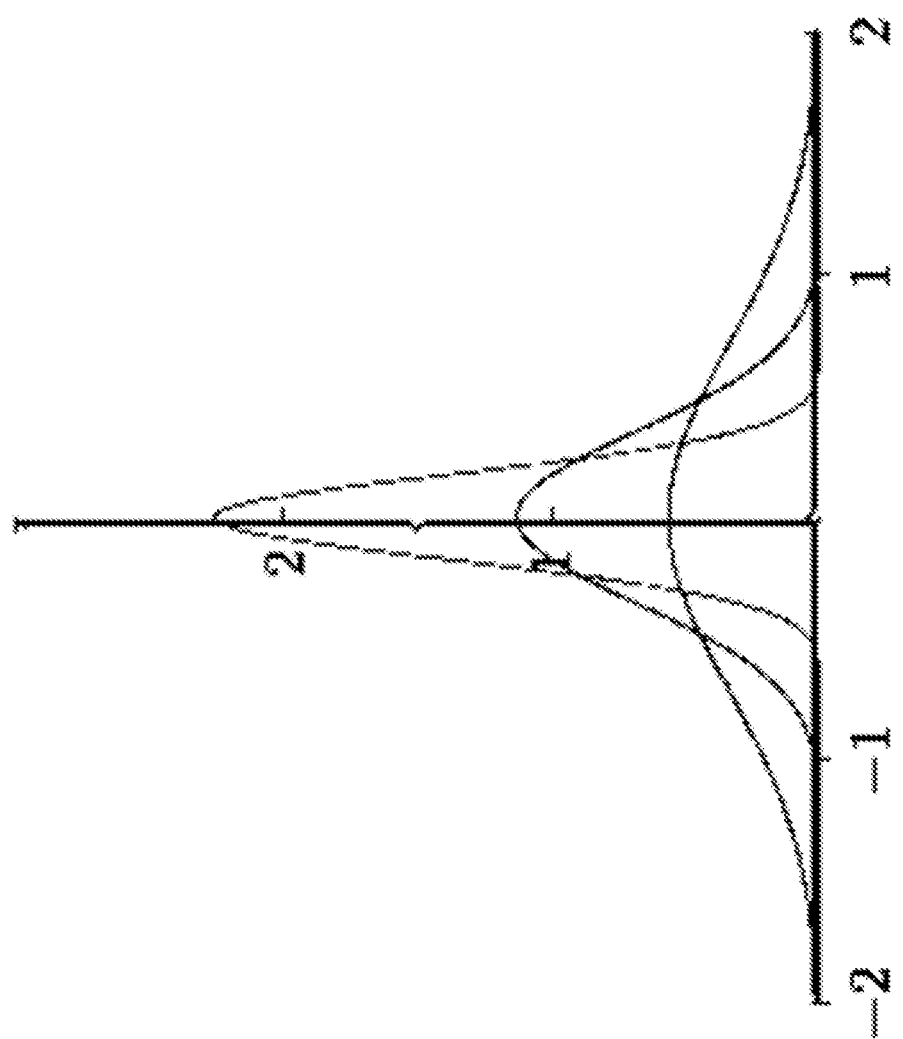
FIG. 8 graphically represents a differentiable function with three different parameters in accordance with example embodiments.

FIG. 8 shows different shapes of the zero-centered Gaussian distribution density function $\delta_\varepsilon(x)$ for $\varepsilon=1$, 0.5, 0.25. As shown in FIG. 8, each of the three different shaped zero-centered Gaussian distribution density functions $\delta_\varepsilon(x)$ are symmetric about the y axis.

Equation (16) and FIG. 8 demonstrate one example of differentiable functions that may be used during back propagation to represent the discrete functions of binarize operation 212 and ternarize operation 204. In other examples, different differentiable functions may be used to represent the discrete function of the feature tensor and weight tensor quantization operations. The use of differentiable functions during backpropagation may mitigate against gradient noise introduced during backpropagation.

Once training of the training stage convolution block 100 is complete, the learned parameters are then converted to a suitable format for inference stage convolution block 200 (Action 706). In particular, as described above, the ternary weight tensor $W_{ter}^i$ learned in respect of training stage computational block 100 is decomposed by mapping function 260 operation into positive weight tensor $W_{+1}^i$ and negative weight tensor $W_{-1}^i$, which are stored as the trained weight parameters for inference stage computational block 200. Furthermore, the threshold tensor $threshold_{int}^i$ is calculated as per equation (11) based on the parameters $\mu_B$, $\beta^i$, $\sigma_B$, $\gamma^i$ of the BN operation 208 that were learned during training of training stage computational operation 100. The threshold tensor $threshold_{int}^i$ is stored as the trained threshold parameters for inference stage computational block 200.

The positive weight tensor $W_{+1}^i$, negative weight tensor $W_{-1}^i$, and threshold tensor $threshold_{int}^i$ can be deployed (Action 708), along with software code for implementing an NN that includes inference stage computational block 200, to one or more hardware devices for inference operations.

As described above, instead of using matrix multiplication operations that require multiply and accumulate functions to determine tensor dot products, the inference stage computational block 200 relies on low resource computing operations 256, including AND operations, POPCOUNT operations, and SUBTRACTION operations. Furthermore, inference stage computational block 200 relies on a simple Boolean compare operation 258 to replace BN operation 208, activation operation 210 and binarize operation 212.

The low resource computational operations 256 of inference stage computational block 200 may in some applications enable a hardware device to perform a given inference task with less computational cost and greater efficiency than previous solutions. An NN that incorporates one or more layers implemented by an inference stage computational block 200 may be suitable for deployment on a computationally constrained hardware device (e.g., a hardware device that has one or more of limited processing power, limited memory or limited power supply). The use of a trained NN that incorporates layers based on low resource computing operations 256 (e.g., AND, POPCOUNT, SUBTRACTION, CMP) may enable the trained NN to run on a processing system at a lower computational cost and thus be more suitable for execution by a general purpose CPU or micro-controller. Further benefits may include reducing hardware cost, improving device battery life and enabling a trained NN to be deployed to a wider range of hardware devices.

Although described above in the context of an inference stage computational block 200 that implements a fully connected NN layer, the low resource computing operations 256 and compare operation 258 can also be applied in inference stage computational block that implements a non-fully connected layer of an NN, such as a convolution layer of a convolution NN. As described above, in the case of a fully connected layer, each individual computational unit of a computational block receives the same set of input feature elements, but applies a respective set of weight elements. In the case of a convolution layer, each individual computational unit of a computational block receives a different, possibly overlapping, set of input feature elements (resulting from the convolution of a filter over an input feature volume), but applies the same set of weight elements (e.g., a filter). In the case of a convolution computational unit of a convolution computational block, dot products are determined in respect of similar sized matrices (e.g., sets) of weight and feature elements rather than vectors as described above in respect of a fully connected layer; nonetheless, the same low resource computing operations described above can also be applied to provide integer feature element outputs that correspond to the dot product of two matrices.

In example embodiments, NN that include inference stage blocks that use the low resource computing operations 256 and compare operations 258 described above may be configured for a number of different inference tasks, including for example, to extract features of video images for facial or object recognition applications.

In some embodiments, a deep NN with an input layer, an output layer, and one or more hidden layers between the input layer and the output layer may include one or more training stage computational blocks 100 during a training stage. When the NN is deployed for inference purposes, the one or more training stage computational blocks 100 are replaced with respective inference stage computational blocks 200. The trained parameters leaned using training stage computational blocks 100 are converted into a format suitable for the low resource computing operations 256 of inference-stage computational blocks 200. The NN may be software-implemented by machine readable instructions that are executed using a processing unit, such as a tensor processing unit or a neural processing unit. Alternatively, the NN may be implemented using software that includes machine readable instructions executed by a dedicated hardware device, such as a compact, energy efficient AI chip (e.g. a microprocessor which is specifically designed to execute NN operations tasks faster, using less power than a conventional microprocessor) that includes a small number of logical gates. In example embodiments the NN is trained using a processing unit that is more powerful than the processing systems on which the trained NN is ultimately deployed for inference operations.

Figure 9:
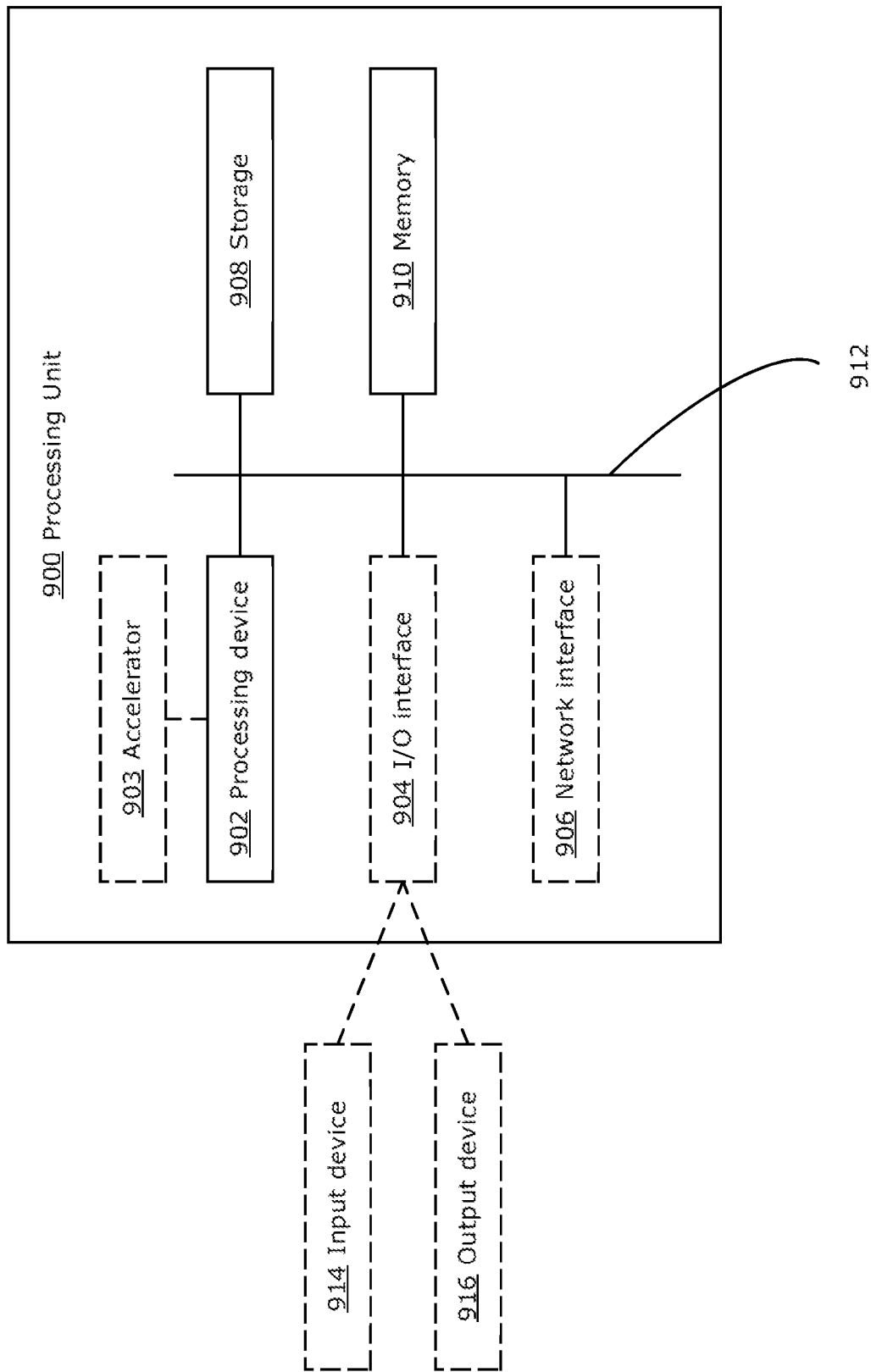
FIG. 9 is a block diagram illustrating an example processing system that may be used to execute machine readable instructions of a NN that includes one or more computational blocks shown in FIG. 1 or 3.

FIG. 9 is a block diagram of an example inference stage hardware device that includes a processing unit 900, which may be used for training purposes to execute the machine executable instructions of a NN that includes one or more training stage computational blocks 100, or during post-training inference to execute machine executable instructions of a trained NN that includes one or more inference stage computational blocks 200. Other processing unit configurations suitable for implementing embodiments described in the present disclosure may be used, which may include components different from those discussed below. Although FIG. 9 shows a single instance of each component, there may be multiple instances of each component in the processing unit 900.

The processing unit 900 may include one or more processing devices 902, such as a processor, a microprocessor, an application-specific integrated circuit (ASIC), a field-programmable gate array (FPGA), a dedicated logic circuitry, or combinations thereof. In example embodiments, a processing unit 900 that is used for training purposes may include an accelerator 903 connected to the processing device 902. The processing unit 900 may also include one or more input/output (I/O) interfaces 904, which may enable interfacing with one or more appropriate input devices 914 and/or output devices 916. The processing unit 900 may include one or more network interfaces 906 for wired or wireless communication with a network (e.g., an intranet, the Internet, a P2P network, a WAN and/or a LAN) or other node. The network interfaces 906 may include wired links (e.g., Ethernet cable) and/or wireless links (e.g., one or more antennas) for intra-network and/or inter-network communications.

The processing unit 900 may also include one or more storage units 908, which may include a mass storage unit such as a solid state drive, a hard disk drive, a magnetic disk drive and/or an optical disk drive. The processing unit 900 may include one or more memories 910, which may include a volatile or non-volatile memory (e.g., a flash memory, a random access memory (RAM), and/or a read-only memory (ROM)). The non-transitory memory(ies) 910 may store instructions for execution by the processing device(s) 902, such as to carry out examples described in the present disclosure. The memory(ies) 910 may include other software instructions, such as for implementing an operating system and other applications/functions. In some examples, memory 910 may include software instructions for execution by the processing device 902 to implement and train a neural network that includes the bitwise computation block 100 of the present disclosure. In some examples, memory 910 may include software instructions and data (e.g., weight and threshold parameters) for execution by the processing device 902 to implement a trained neural network that includes the inference stage computation block 200 of the present disclosure.

In some examples, one or more data sets and/or modules may be provided by an external memory (e.g., an external drive in wired or wireless communication with the processing unit 900) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 912 providing communication among components of the processing unit 900, including the processing device(s) 902, I/O interface(s) 904, network interface(s) 906, storage unit(s) 908 and/or memory(ies) 910. The bus 912 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all publishes papers identified in this disclosure are incorporated herein by reference.

The invention claimed is:

1. A computer implemented method comprising:
applying a plurality of low resource computing operations to a binary input feature tensor to generate an integer feature tensor that is equivalent to an output of multiplication and accumulation operations performed in respect of a ternary weight tensor and the binary input feature tensor, wherein the plurality of low resource computing operations are applied to the binary input feature tensor using first and second weight tensors that each include n binary elements and that collectively represent a respective n elements of the ternary weight tensor; and
performing a Boolean compare operation between the generated integer feature tensor and a learned comparison threshold to generate a binary output feature tensor.

2. The method of claim 1, wherein:
the generated integer feature tensor comprises a set of m integer elements, each integer element having a value that is the equivalent of a dot product of a set of n ternary elements of the ternary weight tensor and a set of n binary elements of the binary input feature tensor.

3. The method of claim 2 wherein, for each integer element of the integer feature tensor:
applying the plurality of low resource computing operations comprises, for each integer element of the integer feature tensor:
applying a first bitwise logical AND operation between the n binary elements of the first weight tensor and the n binary elements of the binary input feature tensor;
applying a second bitwise logical AND operation between the n binary elements of the second weight tensor and the n binary elements of the binary input feature tensor; and
generating the integer element based on a number of bits of a predetermined value included in the output of the first bitwise logical AND operation and the output of the second bitwise logical AND operation.

4. The method of claim 3 wherein applying the plurality of low resource computing operations comprises, for each integer element of the integer feature tensor:
applying a first POPCOUNT operation to count the number of bits of the predetermined value included in the output of the first bitwise logical AND operation; and
applying a second POPCOUNT operation to count the number of bits of the predetermined value included in the output of the second bitwise logical AND operation;
wherein generating the integer element comprises applying a subtraction operation between the outputs of the first POPCOUNT operation and the second POPCOUNT operation to output the integer element.

5. The method of claim 3 wherein the n elements of the ternary weight tensor are decomposed to into n pairs of binary elements to generate the n binary elements of the first weight tensor and the n binary elements of the second weight tensor.

6. The method of claim 5 wherein applying the plurality of low resource computing operations and performing the comparison operation are performed in a layer of a second neural network trained to perform an inference task, the method further comprising training a first neural network to perform the inference task by learning network parameters for the first neural network that include the ternary weight tensor.

7. The method of claim 6 wherein training the first neural network comprises:
inferring an output tensor for each of a plurality input feature tensors of a training dataset using the network parameters;
determining a cost of the network parameters based on the inferring; and
updating the network parameters using gradient decent and backpropagation,
wherein the inferring, determining and updating are repeated until the cost of the network parameters reaches an optimization threshold.

8. The method of claim 7 wherein the first neural network includes a layer that corresponds to the layer of the second neural network, the layer of the first neural network being configured to:
perform multiplication and accumulation operations using the ternary weight tensor and a binary input feature tensor from the training dataset to generate a training integer feature tensor; and
perform batch normalization, activation and binarize operations to the generated training integer feature tensor to generate a training binary output feature tensor, the batch normalization being based on a set of batch normalization parameters,
wherein the network parameters that are learned include the batch normalization parameters, and the comparison threshold is a tensor of m integer threshold values computed based on the learned batch normalization parameters.

9. The method of claim 8 wherein the batch normalization parameters include a scaling factor tensor and a bias tensor, and training the first neural network comprises initializing one or more of the network parameters to maintain a variance of values within the network parameters within a target variance range.

10. The method of claim 8 wherein during training of the first neural network, the ternary weight tensor is generated by quantizing values of a corresponding real value weight tensor using a non-differentiable teranize operation, and the binarize operation applies a non-differentiable binarize operation, and during backpropagation the non-differentiable teranize operation and non-differentiable binarize operation are each approximated by respective differentiable operations.

11. A processing unit, comprising:
a processing device;
a storage operatively coupled to the processing device and storing executable instructions that when executed by the processing device causes the processing unit to implement a computational block of a trained neural network configured to perform an inference task, the computational block being configured to:
apply a plurality of low resource computing operations to a binary input feature tensor to generate an integer feature tensor that is equivalent to an output of multiplication and accumulation operations performed in respect of a ternary weight tensor and the binary input feature tensor, wherein the plurality of low resource computing operations are applied to the binary input feature tensor using first and second weight tensors that each include n binary elements and that collectively represent a respective n elements of the ternary weight tensor; and
perform a Boolean compare operation between the generated integer feature tensor and a learned comparison threshold to generate a binary output feature tensor.

12. The processing unit of claim 11, wherein:
the generated integer feature tensor comprises a set of m integer elements, each integer element having a value that is the equivalent of a dot product of a set of n ternary elements of the ternary weight tensor and a set of n binary elements of the binary input feature tensor.

13. The processing unit of claim 12 wherein, for each integer element of the integer feature tensor, the computational block is configured to:
apply the plurality of low resource computing operations, for each integer element of the integer feature tensor, by:
applying a first bitwise logical AND operation between the n binary elements of the first weight tensor and the n binary elements of the binary input feature tensor;
applying a second bitwise logical AND operation between the n binary elements of the second weight tensor and the n binary elements of the binary input feature tensor; and
generating the integer element based on a number of bits of a predetermined value included in the output of the first bitwise logical AND operation and the output of the second bitwise logical AND operation.

14. The processing unit of claim 13 wherein the computational block is configured to apply the plurality of low resource computing operations, for each integer element of the integer feature tensor, by:
applying a first POPCOUNT operation to count the number of bits of the predetermined value included in the output of the first bitwise logical AND operation; and
applying a second POPCOUNT operation to count the number of bits of the predetermined value included in the output of the second bitwise logical AND operation;
wherein generating the integer element comprises applying a subtraction operation between the outputs of the first POPCOUNT operation and the second POPCOUNT operation to output the integer element.

15. The processing unit of claim 13 wherein the n binary elements of the first weight tensor and the n binary elements of the second weight tensor n are stored in the storage and correspond to a decomposition of a respective n elements of the ternary weight tensor into n pairs of binary elements to generate the n binary elements of the first weight tensor and the n binary elements of the second weight tensor.

16. The processing unit of claim 15 wherein the ternary weight tensor is part of a set of network parameters learned through training of a training neural network to perform the inference task.

17. The processing unit of claim 16 wherein the training neural network is trained by:
inferring an output tensor for each of a plurality input feature tensors of a training dataset using the network parameters;
determining a cost of the network parameters based on the inferring; and
updating the network parameters using gradient decent and backpropagation,
wherein the inferring, determining and updating are repeated until the cost of the network parameters reaches an optimization threshold.

18. The processing unit of claim 17 wherein the training neural network includes a computational block that corresponds to the computational block of the trained neural network, the computational block of the training neural network being configured to:
perform multiplication and accumulation operations using the ternary weight tensor and a binary input feature tensor from the training dataset to generate a training integer feature tensor; and
perform batch normalization, activation and binarize operations to the generated training integer feature tensor to generate a training binary output feature tensor, the batch normalization being based on a set of batch normalization parameters,
wherein the network parameters that are learned include the batch normalization parameters, and the comparison threshold is a tensor of m integer threshold values computed based on the learned batch normalization parameters.

19. The processing unit of claim 16 in combination with a further processing unit, wherein the further processing unit is configured to train the training neural network to perform the inference task.

20. A computer program product comprising a non-transient computer readable medium that stores computer program instructions for configuring a processing unit to implement a computational block of a trained neural network configured to perform an inference task, the computational block being configured to:
apply a plurality of low resource computing operations to a binary input feature tensor to generate an integer feature tensor that is equivalent to an output of multiplication and accumulation operations performed in respect of a ternary weight tensor and the binary input feature tensor, wherein the plurality of low resource computing operations are applied to the binary input feature tensor using first and second weight tensors that each include n binary elements and that collectively represent a respective n elements of the ternary weight tensor; and perform a Boolean compare operation between the generated integer feature tensor and a learned comparison threshold to generate a binary output feature tensor.

* * * * *

UNITED STATES PATENT AND TRADEMARK OFFICE
CERTIFICATE OF CORRECTION

PATENT NO. : 12,033,070 B2
APPLICATION NO. : 16/900658
DATED : July 9, 2024
INVENTOR(S) : Xinlin Li and Vahid Partovi Nia It is certified that error appears in the above-identified patent and that said Letters Patent is hereby corrected as shown below:

In the Specification

Column 7, Line 66:
"$X_{bin}{}^{i+1}=(x_{bin(1)}{}^{i+1}, (x_{bin(2)}{}^{i+1}, \ldots, x_{bin(m)}{}^{i+1})$" should read
-- $X^{i+1}_{bin} = (x^{i+1}_{bin(1)}, x^{i+1}_{bin(2)}, \ldots, x^{i+1}_{bin(m)})$ --.

Column 8, Line 7:
"where 1=1" should read --where $i$=1--.

Column 9, Line 57:
"in which a" should read --in which $\sigma$--.

Column 10, Line 24:
"output feature tensor XW may" should read --output feature tensor $X^{i+1}_{bin}$ --.

Column 12, Line 24:
"w'ter=1" should read --$w^j{}_{ter}$= 1--.

Column 14, Lines 10-11:
"operations 256 operations 256" should read --operations 256--.

Column 14, Line 14:
"XBIN$^i$,W$_{-1(a)}{}^i$)" should read -- $(X^i_{bin}, W^i_{-1(a)})$ --.

Column 14, Line 21:
"the at neuron" should read --the $a^{th}$ neuron--.

Signed and Sealed this
Seventeenth Day of December, 2024

Derrick Brent
*Acting Director of the United States Patent and Trademark Office*

CERTIFICATE OF CORRECTION (continued)
U.S. Pat. No. 12,033,070 B2

Column 15, Lines 8-19, Equation 10 should read as:

$$X_{bin}^{i+1} = \text{Binarize}\left(\sigma\left(\text{BatchNorm}(Z^i)\right)\right) = \begin{cases} 1 & \sigma\left(\text{BatchNorm}(Z^i)\right) > 0 \\ 0 & \sigma\left(\text{BatchNorm}(Z^i)\right) \leq 0 \end{cases}$$

$$= \begin{cases} 1 & \text{BatchNorm}(Z^i) > 0 \\ 0 & \text{BatchNorm}(Z^i) \leq 0 \end{cases} = \begin{cases} 1 & \gamma^i \frac{Z^i - \mu_B}{\sqrt{\sigma_B^2 + \epsilon}} + \beta^i > 0 \\ 0 & \gamma^i \frac{Z^i - \mu_B}{\sqrt{\sigma_B^2 + \epsilon}} + \beta^i \leq 0 \end{cases}$$

-- --.

Column 15, Line 30:
"the value of E is" should read --the value of $\varepsilon$ is--.

Column 15, Line 59:
"the value of E is" should read --the value of $\varepsilon$ is--.

Column 16, Lines 23-27, Equation 14 should read as:

$$Z_{int}^i = \alpha_p^i \text{POPCOUNT}\left(\text{AND}(X_{bin}^i, W_{+1}^i)\right) - \alpha_n^i \text{POPCOUNT}\left(\text{AND}(X_{bin}^i, W_{-1}^i)\right)$$

$$W_{ter}^i \in \{-1, 0, +1\}^{m \times n}, W_{+1}^i \in \{0,1\}^{m \times n} W_{-1}^i \in \{0,1\}^{m \times n}, X_{bin}^i \in \{0,1\}^n, Z^i \in \{\mathbb{R}\}^m$$

-- --.

Column 17, Line 60:
"function $\Gamma_\varepsilon(x)$" should read --function $\delta_\varepsilon(x)$--.